US012492358B2

(12) United States Patent
McKeon et al.

(10) Patent No.: US 12,492,358 B2
(45) Date of Patent: Dec. 9, 2025

(54) LIQUID COMPOSITION WITH ENCAPSULATED FRAGRANCE AND ALCOHOL ETHOXYLATE SUITABLE FOR USE WITH UNIT DOSE PACKAGES

(71) Applicant: Henkel AG & Co. KGaA, Düsseldorf (DE)

(72) Inventors: Jessica Eileen McKeon, Trumbull, CT (US); Wei Sun, Trumbull, CT (US); Brian Alan Warren, Bowling Green, KY (US); Rebekah Cathleen Seabury, Trumbull, CT (US)

(73) Assignee: Henkel AG & Co. KGaA, Düsseldorf (DE)

( * ) Notice: Subject to any disclaimer, the term of this patent is extended or adjusted under 35 U.S.C. 154(b) by 526 days.

(21) Appl. No.: 17/941,582

(22) Filed: Sep. 9, 2022

(65) Prior Publication Data

US 2024/0101930 A1 Mar. 28, 2024

(51) Int. Cl.

| | |
|---|---|
| ***C11D 1/72*** | (2006.01) |
| ***C11D 1/10*** | (2006.01) |
| ***C11D 3/10*** | (2006.01) |
| ***C11D 3/20*** | (2006.01) |
| ***C11D 3/30*** | (2006.01) |
| ***C11D 3/37*** | (2006.01) |

(52) U.S. Cl.
CPC .............. *C11D 3/2013* (2013.01); *C11D 1/10* (2013.01); *C11D 1/72* (2013.01); *C11D 3/10* (2013.01); *C11D 3/30* (2013.01); *C11D 3/3707* (2013.01); *C11D 2111/12* (2024.01)

(58) Field of Classification Search
CPC ........... C11D 1/72; C11D 3/042; C11D 3/044; C11D 3/2006; C11D 3/2041; C11D 3/2065; C11D 3/3707; C11D 3/3746; C11D 3/505; C11D 17/043
See application file for complete search history.

(56) References Cited

U.S. PATENT DOCUMENTS

| | | | |
|---|---|---|---|
| 4,514,552 | A | 4/1985 | Shay et al. |
| 5,192,592 | A | 3/1993 | Shay |
| 7,217,443 | B2 | 5/2007 | Bobsein et al. |
| 8,497,234 | B2 | 7/2013 | Mayer et al. |

(Continued)

FOREIGN PATENT DOCUMENTS

| | | | |
|---|---|---|---|
| GB | 870994 | A | 6/1961 |
| WO | 2020104320 | A1 | 5/2020 |

OTHER PUBLICATIONS

PCT International Search Report—WO PCT/US2023/073894—Completed: Dec. 26, 2023 Mailing date: Dec. 26, 2023 Number of pp. 9.

*Primary Examiner* — Brian P Mruk
(74) *Attorney, Agent, or Firm* — Blank Rome LLP

(57) ABSTRACT

A liquid fabric treatment composition suitable for encapsulation in a unit dose pack contains from about 3% by weight to about 8% by weight of an alcohol ethoxylate, from about 10% by weight to about 70% by weight of an encapsulated fragrance slurry; from about 0.5% by weight to about 5% by weight of a rheology modifier; from about 0.1% by weight to about 3% by weight of a pH adjusting agent; and from about to about 5% by weight to about 60% by weight of non-aqueous solvent. The liquid composition is stable at elevated temperatures and has a lower yield stress and a lower storage modulus than a composition having no alcohol ethoxylate.

23 Claims, 2 Drawing Sheets

(56) References Cited

U.S. PATENT DOCUMENTS

| | | | |
|---|---|---|---|
| 2015/0232791 | A1 | 8/2015 | Droege et al. |
| 2017/0002301 | A1 | 1/2017 | Dihora et al. |
| 2018/0265825 | A1* | 9/2018 | Park ......................... C11D 1/83 |
| 2018/0346850 | A1* | 12/2018 | Piorkowski ......... C11D 11/0082 |
| 2018/0371378 | A1 | 12/2018 | Danzer |
| 2019/0085273 | A1 | 3/2019 | Gutowski et al. |
| 2020/0283704 | A1 | 9/2020 | Smets et al. |
| 2020/0283706 | A1 | 9/2020 | Panandiker et al. |
| 2021/0062118 | A1 | 3/2021 | Sun et al. |
| 2021/0309940 | A1 | 10/2021 | Sun et al. |
| 2022/0177809 | A1 | 6/2022 | Blattner et al. |
| 2022/0403304 | A1* | 12/2022 | Sun ...................... C11D 3/3707 |
| 2023/0203411 | A1* | 6/2023 | Sun ...................... C11D 3/0047 510/139 |

* cited by examiner

LIQUID COMPOSITION WITH ENCAPSULATED FRAGRANCE AND ALCOHOL ETHOXYLATE SUITABLE FOR USE WITH UNIT DOSE PACKAGES

FIELD OF THE INVENTION

This disclosure relates to liquid laundry compositions comprising encapsulated fragrance.

BACKGROUND OF THE INVENTION

Unit dose laundry and fabric treatment products provide a pre-measured quantity of detergent and/or other fabric care components, such as fabric softeners and fabric fragrance. The pre-measured liquid packed in a water-soluble film reduces issues of accidental spillage and minimizes over-dosage of product, and has proven popular with consumers.

Encapsulated fragrances are widely used in laundry detergent and fabric treatment products to provide fresh laundry fragrance to clothing. Encapulated fragrances can provide a better fragrance delivery and longer lasting fragrance to fabrics as compared to the addition of a fragrance to a laundry product because the microcapsules protect the fragrances from physical or chemical reactions with incompatible ingredients in the laundry composition, and from volatilization or evaporation. Furthermore, many microcapsule structures are stable in water, and only rupture and thereby deliver the fragrance payload when the microcapsule is dried during the fabric drying cycle. Therefore, the fabric fragrance is delivered after the wash and rinse cycle is complete, and is not diluted by the wash and rinse cycles. Depending on the particular microcapsule formulation used, the microcapsule rupture may also be caused by increased temperature in a fabric drying cycle, and/or physical shear from a tumble dry cycle.

Since encapsulated fragrances require water to remain intact and suspended in their formulations, it is a challenge to incorporate encapsulated fragrances in unit dose laundry and fabric treatment products, which are enclosed in a water-soluble film. Liquids in unit dose products need to have low water activity to avoid dissolving the film prematurely. Typical unit dose products are formulated with film-compatible solvents such as polyethylene glycol, glycerin or propylene glycol in order to avoid problems of premature dissolution of the unit dose product. However, when encapsulated fragrances are mixed with some film-compatible solvents such as polyethylene glycol, the fragrance encapsulations agglomerate and form large clumps that do not dissolve when added to wash liquor.

Other solvents, such as glycerin and propylene glycol, do not cause high levels of encapsulation agglomeration. However, these solvents do not provide shelf stable laundry or fabric care formulations, as formulations with these solvents show phase separation between the formulation components within 8 hours of formulation. Different combinations of these solvents have different separation times, but all separate within hours. During commercial manufacturing of unit dose liquid laundry products, the produced liquids may be stored in a non-mixing tank for weeks, and the unit doses when manufactured may be warehoused for months or years before being sold to a consumer. To be commercially feasible, compositions must be stable at high temperature for at least 4 weeks and also after exposure to high-temperature shipping conditions. Thus, there is a need for a formula that both stabilizes the encapsulated fragrances and minimizes film interactions without compromising dissolution.

Structuring benefits are desired at as low a level of external structurant as possible for cost and formulation concerns. For example, excessive amounts of external structuring agent may provide the particle suspension capability but result in the liquid composition becoming overly viscous. It is important for liquid laundry products to have a relatively low yield stress and storage modulus to ensure the composition is adequately dissolved and dispersed in a wash cycle.

Applicant's application Ser. No. 17/564,980, filed Dec. 29, 2021 (which is hereby incorporated by reference), discloses a fabric care formulation with 0.15% by weight to about 1.2% by weight rheology modifier, such as a Hydrophobically Modified Alkali Soluble Emulsion (HASE) polymer, and about 0.1% by weight to about 3% by weight of a pH adjusting agent in a fabric treatment unit dose product comprising about 10% by weight to about 70% by weight of an encapsulated fragrance slurry and about 10% by weight to about 60% by weight of a polyethylene glycol. Such formulations can minimize or prevent phase separation as compared to formulas without a rheology modifier. No difference in separation index was observed when 0-20% by weight of an alcohol ethoxylate was added to the compositions. Therefore, at that time, it was believed by the Applicant that alcohol ethoxylate was not necessary.

It is an object of the invention to improve upon existing liquid fabric treatments compositions comprising encapsulated fragrance by providing compositions containing encapsulated fragrance slurry that remain homogenously dispersed upon storage and that dissolve reliably when used in a wash cycle. In particular, it is an object of the invention to provide liquid fabric treatment compositions containing encapsulated fragrance slurry that result in a lower yield stress and smaller storage modulus compared to prior art compositions. The liquid compositions are suitable for encapsulation in a unit dose package.

SUMMARY OF THE INVENTION

Liquid fabric treatment compositions having less than 40% by weight water and comprising from about 3.75% by weight to about 8% by weight of an alcohol ethoxylate (AE) nonionic surfactant, encapsulated fragrance slurry, and a rheology modifier, such as a hydrophobically modified alkali soluble emulsion (HASE) polymer. Such liquid compositions have been shown to provide surprisingly better rheological properties in terms of storage modulus G', and yield stress, compared to known compositions containing encapsulated fragrance slurry and a rheological polymer but having no AE. As such, the structured liquid compositions disclosed herein are useful for significant improvement in dissolvability and dispersibility of particle components in an encapsulated fragrance suspension using alcohol ethoxylate.

Applicant's prior work showed that alcohol ethoxylate was not necessary to produce room temperature stable compositions containing encapsulated fragrance slurry. Thus, it was unexpectedly and surprisingly found that the presence and amount of an alcohol ethoxylate is critical to maintaining stability at elevated temperatures, and for reliably dissolving and dispersing compositions containing encapsulated fragrance slurry. The compositions described herein containing about 3.75% by weight to about 8% by weight of an alcohol ethoxylate do not phase separate when stored at 40° C. for 1 to 4 weeks. Moreover, the compositions have a lower yield stress and lower storage modulus G' than a composition without alcohol ethoxylate.

In one aspect, the present disclosure concerns a fabric treatment unit dose product comprising at least one water-soluble compartment enclosing a liquid composition. The liquid composition comprises from about 3.75% by weight to about 8% by weight of an alcohol ethoxylate, from about 10% by weight to about 70% by weight of an encapsulated fragrance slurry, from about 0.5% by weight to about 5% by weight of a rheology modifier, from about 0.1% by weight to about 3% by weight of a pH adjusting agent; and from about to about 5% by weight to about 60% by weight of non-aqueous solvent.

In some embodiments, the alcohol ethoxylate is at least about 3.75% by weight, more preferably at least about 4.0% by weight of the composition. In some embodiments, the alcohol ethoxylated is less than 5.5% by weight of the composition. In some of those embodiments, the alcohol ethoxylate is about 4.0% to about 5.0% by weight of the composition.

In certain embodiments, the alcohol ethoxylate is a C12-15 7EO alcohol ethoxylate.

Preferably, the rheology modifier is an acrylic copolymer, an Alkali Soluble Emulsion (ASE), or a Hydrophobically Modified Alkali Soluble Emulsion (HASE) polymer. Most preferably, the rheology modifier is a HASE.

In some embodiments, the liquid compositions comprise from about 10% by weight to about 60% by weight of a polyethylene glycol having a molecular weight between about 200 and about 1000 Daltons. In certain preferred embodiments, the polyethylene glycol is PEG 400.

In some embodiments, the pH adjusting agent is selected from the group consisting of triethanolamine, monoethanolamine, tromethamine, sodium carbonate, sodium bicarbonate, sodium borate, diethylenetriaminepentaacetic acid (DTPA), ethylenediaminetetraacetic acid (EDTA), methylglycinediacetic acid (MGDA), iminodisuccinic acid (IDS), ethylenediamine-N,N'-disuccinic acid (EDDS), and tetrasodium glutamate diacetate (GLDA). In certain preferred embodiments, the pH adjusting agent is triethanolamine.

In some embodiments, the non-aqueous solvent is one or more solvent selected from the group consisting of ethylene glycol, glycerin, ethanol, dipropylene glycol, tripropylene glycol methyl ether; and propylene glycol. In some of those embodiments, the non-aqueous solvent comprises a first non-aqueous solvent that is about 5% by weight to about 40% by weight of the liquid composition and a second non-aqueous solvent that is about 1% by weight to about 20% by weight of the liquid composition. In some of those embodiments, the first non-aqueous solvent is glycerin. In some embodiments, the second non-aqueous solvent is propylene glycol.

In another aspect, a liquid fabric treatment composition comprises less than 40% by weight water, from about 3.75% by weight to about 8% by weight of an alcohol ethoxylate; from about 10% by weight to about 70% by weight of an encapsulated fragrance slurry, from about 0.5% by weight to about 5% by weight of a rheology modifier, from about 0.1% by weight to about 3% by weight of a pH adjusting agent, from about 5% by weight to about 60% by weight of nonaqueous solvent, and from about 10% by weight to about 60% by weight of a polyethylene glycol having a molecular weight between about 200 and about 1000 Daltons. The composition does not phase separate when stored at 40° C. for 1 week. The composition has a storage modulus and a yield stress less than a comparable composition having no alcohol ethoxylate.

In some embodiments, the alcohol ethoxylate is at least about 4.0% by weight of the composition. In some embodiments, the alcohol ethoxylate is less than 5.5% by weight of the composition. In some of those embodiments, the alcohol ethoxylate is about 4.0% to about 5.0% by weight of the composition.

In certain embodiments, the alcohol ethoxylate is a C12-15 7EO alcohol ethoxylate.

Preferably, the rheology modifier is an acrylic copolymer, an Alkali Soluble Emulsion (ASE), or a Hydrophobically Modified Alkali Soluble Emulsion (HASE) polymer. Most preferably, the rheology modifier is a HASE polymer.

In certain embodiments, the polyethylene glycol has a molecular weight of about 400 Daltons, i.e. is PEG 400.

In some embodiments, the pH adjusting agent is selected from the group consisting of triethanolamine, monoethanolamine, tromethamine, sodium carbonate, sodium bicarbonate, sodium borate, diethylenetriaminepentaacetic acid (DTPA), ethylenediaminetetraacetic acid (EDTA), methylglycinediacetic acid (MGDA), iminodisuccinic acid (IDS), ethylenediamine-N,N'-disuccinic acid (EDDS), and tetrasodium glutamate diacetate (GLDA). In some preferred embodiments, the pH adjusting agent is triethanolamine.

In certain embodiments, the non-aqueous solvent is one or more solvent selected from the group consisting of ethylene glycol, glycerin, ethanol, dipropylene glycol, tripropylene glycol methyl ether; and propylene glycol. In some of those embodiments, the non-aqueous solvent comprises a first non-aqueous solvent that is about 5% by weight to about 40% by weight of the liquid composition and a second non-aqueous solvent that is about 1% by weight to about 20% by weight of the liquid composition. In some of those embodiments, the second non-aqueous solvent is propylene glycol. In certain embodiments, the first non-aqueous solvent is glycerin.

In yet another aspect, a fabric treatment unit dose product comprises at least one water-soluble compartment enclosing a liquid composition. The liquid composition comprises from about 3.75% by weight to about 8% by weight of an alcohol ethoxylate, from about 10% by weight to about 70% by weight of an encapsulated fragrance slurry, from about 0.5% by weight to about 5% by weight of a rheology modifier, from about 0.1% by weight to about 3% by weight of a pH adjusting agent, from about 5% by weight to about 40% by weight of a first nonaqueous solvent, from about 0% by weight to about 20% by weight of a second nonaqueous solvent; and from about 10% by weight to about 60% by weight of a polyethylene glycol, wherein the polyethylene glycol has a molecular weight between about 200 and about 1000 Daltons.

In some embodiments, a fabric treatment unit dose product consists essentially of a water-soluble compartment enclosing a liquid composition. The liquid composition consists essentially of from about 3.75% by weight to about 8% by weight of an alcohol ethoxylate, from about 25% by weight to about 48% by weight of an encapsulated fragrance slurry, from about 1.5% by weight to about 3.5% by weight of a rheology modifier, from about 0.5% by weight to about 2% by weight of a pH adjusting agent, from about 10% by weight to about 25% by weight of a first nonaqueous solvent, from about 5% by weight to about 10% by weight of a second nonaqueous solvent; and from about 25% by weight to about 50% by weight of a polyethylene glycol, wherein the polyethylene glycol has a molecular weight between about 200 and about 1000 Daltons.

In certain embodiments, a fabric treatment unit dose product consists of a water-soluble compartment enclosing a liquid composition. The liquid composition consists of from about 3.75% by weight to about 8% by weight of an alcohol ethoxylate, from about 25% by weight to about 48% by weight of an encapsulated fragrance slurry, from about 1.5% by weight to about 3.5% by weight of a rheology modifier, from about 0.5% by weight to about 2% by weight of a pH adjusting agent, from about 10% by weight to about 25% by weight of a first nonaqueous solvent, from about 5% by weight to about 10% by weight of a second nonaqueous solvent; and from about 25% by weight to about 50% by weight of a polyethylene glycol, wherein the polyethylene glycol has a molecular weight between about 200 and about 1000 Daltons.

In some embodiments, the alcohol ethoxylate is at least about 4.0% by weight of the composition. In some embodiments, the alcohol ethoxylated is less than 5.5% by weight of the composition. In some of those embodiments, the alcohol ethoxylate is about 4.0% to about 5.0% by weight of the composition. In certain embodiments, the alcohol ethoxylate is a C12-15 7EO alcohol ethoxylate.

In certain embodiments, the rheology modifier is an acrylic copolymer, an Alkali Soluble Emulsion (ASE), or a Hydrophobically Modified Alkali Soluble Emulsion (HASE) polymer. Preferably, the polyethylene glycol has a molecular weight of about 400 Daltons.

In some embodiments, the pH adjusting agent is selected from the group consisting of triethanolamine, monoethanolamine, tromethamine, sodium carbonate, sodium bicarbonate, sodium borate, diethylenetriaminepentaacetic acid (DTPA), ethylenediaminetetraacetic acid (EDTA), methylglycinediacetic acid (MGDA), iminodisuccinic acid (IDS), ethylenediamine-N,N'-disuccinic acid (EDDS), and tetrasodium glutamate diacetate (GLDA). In certain preferred embodiments, the pH adjusting agent is triethanolamine.

In certain embodiments, the non-aqueous solvent is selected from the group consisting of ethylene glycol, glycerin, ethanol, dipropylene glycol, tripropylene glycol methyl ether; and propylene glycol. In some of those embodiments, the first non-aqueous solvent is glycerin and the second non-aqueous solvent is propylene glycol.

In certain preferred embodiments, the liquid composition enclosed in the unit dose product does not phase separate when stored at 40° C. for 1 to 4 weeks. Moreover, the liquid compositions have a lower yield stress and lower storage modulus G' than a composition without alcohol ethoxylate.

DETAILED DESCRIPTION OF THE INVENTION

Figure 1:
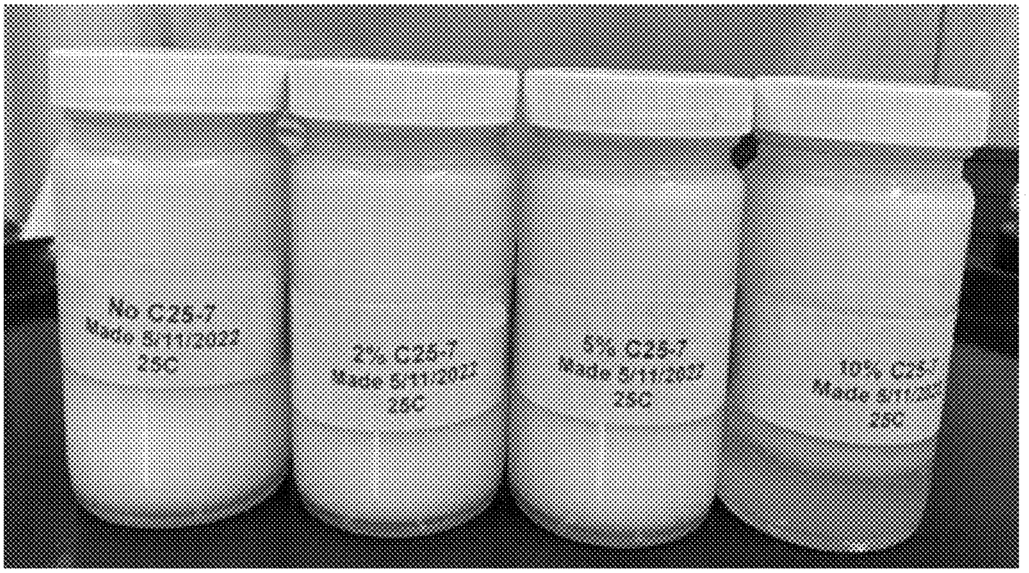
FIG. 1 is a photograph of compositions C0, C2, C5 and C10 of Example 2 after storage for 1 week at about 25° C.

The following detailed description is merely exemplary in nature and is not intended to limit the disclosed laundry compositions and products, or any associated methods for producing or using the same described herein. Furthermore, there is no intention to be bound by any theory presented in the preceding background or the following detailed description.

The term "about" as used in connection with a numerical value throughout the specification and the claims denotes an interval of accuracy, familiar and acceptable to a person skilled in the art. In general, such interval of accuracy is ±10%. Thus, "about ten" means 9 to 11. All numbers in this description indicating amounts, ratios of materials, physical properties of materials, and/or use are to be understood as modified by the word "about," except as otherwise explicitly indicated.

The terms "garment," and "laundry" as used herein, encompass all textile and fabric items typically washed in a washing machine and dried in a clothes dryer, and include clothing, as well as kitchen, table, bedroom and bath fabric items such as sheets, towels, blankets, and other products primarily made of textiles or fabrics.

The terms "fragrance" and "perfume" as used herein are equivalent terms indicating a composition with a pleasant odor.

As used herein, the "%" described in the present application refers to the weight percentage unless otherwise indicated. The terms wt. %, wt %, percent by weight and % by weight are used interchangeably.

The terms "capsule", "microcapsule", and "encapsulate" can be used interchangeably.

The term "fragrance encapsulate" refers a core-shell structure which comprises a microcapsule (shell) and a fragrance (core) entrapped in the microcapsule. The weight of a fragrance encapsulate is the sum of the weight of the microcapsule and the weight of the fragrance (core) entrapped in the microcapsule.

The term "encapsulate fragrance slurry" refers to a core-shell structure which comprises a microcapsule (shell) and a fragrance (core) entrapped in the microcapsule and the water and other ingredients that compose a commercially available fragrance encapsulate slurry. The weight of a encapsulate fragrance slurry is the sum of the weight of the microcapsule, the weight of the fragrance (core) entrapped in the microcapsule, the weight of the water and the weight of the other ingredients.

The term "encapsulated fragrance" refers a fragrance entrapped in the microcapsule. The weight of an encapsulated fragrance is the weight of the fragrance entrapped in the microcapsule, not including the weight of the microcapsule.

As used herein, "rheology modifier" refers to a compound or mixture of compounds that provide either a sufficient yield stress or low shear viscosity to stabilize the non-aqueous gel independently from, or extrinsic from, the structuring effect of any detersive surfactants in the gel. The rheology modifier used in the present invention is an alkali-soluble emulsion (ASE) polymer or a hydrophobically-modified alkali-soluble emulsion (HASE) polymer. A variety of HASE and ASE polymers are known in the art and are commercially available. Preferably, the rheology modifier is a copolymer comprising or consisting of acrylic acid monomer units and alkyl acrylate monomer units.

The term "at least" prior to a number or series of numbers is understood to include the number adjacent to the term "at least," and all subsequent numbers or integers that could logically be included, as clear from context. For example, "at least one non-aqueous solvent" means that 1, 2, 3, or more non-aqueous solvents have the indicated property. When at least is present before a series of numbers or a range, it is understood that "at least" can modify each of the numbers in the series or range. "At least" is also not limited to integers (e.g., "at least 5%" includes 5.0%, 5.1%, 5.18% without consideration of the number of significant figures).

The term "PEG" stands for polyethylene glycol. As conventionally used in the art, the use of PEG alone, not followed by a number, refers to PEG with all possible molecular weights (MW). The use of PEG with a specific number, for example, "PEG 400", indicates PEG having a weight average molecular weight of about the specific number (i.e., 400), for example having weight average MW ranging from about 380 to about 420.

The terms "process" and "method" can be used interchangeably.

Unit Dose Product/Package

In accordance with various embodiments, a unit dose product, also referred to as a single dose pack, is formed by encapsulating one or more fabric treatment compositions within a container, where the container is or includes a film. The container may have one or more separate compartments. In embodiments having more than one compartment, the different compartments may have different fabric treatment compositions providing different functional effects. For example, one compartment may contain a surfactant for dirt removal, another a different surfactant for stain removal, another a fabric softener, and another a fragrance composition. In some embodiments, the film forms one half or more of the container, where the container may also include dyes, print, or other components in some embodiments. The film is water soluble such that the film will completely dissolve when an exterior of the film is exposed to water, such as in a washing machine typically used for laundry. When the film dissolves, the container is ruptured, and the contents are released. As used herein, "water soluble" means at least 2 grams of the solute (the film in one example) will dissolve in 5 liters of solvent (water in one example,) for a solubility of at least 0.4 grams per liter (g/l), at a temperature of 25 degrees Celsius (° C.) unless otherwise specified. Suitable films for packaging are completely soluble in water at temperatures of about 5° C. or greater.

The film is desirably strong, flexible, shock resistant, and non-tacky during storage at both high and low temperatures and high and low humidity. In an exemplary embodiment, the film is initially formed from polyvinyl acetate, and at least a portion of the acetate functional groups are hydrolyzed to produce alcohol groups. Therefore, the film includes polyvinyl alcohol (PVOH), and may include a higher concentration of PVOH than polyvinyl acetate. Such films are commercially available with various levels of hydrolysis, and thus various concentrations of PVOH, and in an exemplary embodiment the film initially has about 85 percent of the acetate groups hydrolyzed to alcohol groups. Some of the acetate groups may further hydrolyze in use, so the final concentration of alcohol groups may be higher than the concentration at the time of packaging. The film may have a thickness of from about 25 to about 200 microns (μm), or from about 45 to about 100 μm, or from about 75 to about 90 μm in various embodiments. The film may include alternate materials in some embodiments, such as methyl hydroxy propyl cellulose and polyethylene oxide, but the film is water soluble in all embodiments.

The single dose pack may be formed from a container having a single compartment, but the single dose pack may be formed from containers with two or more different compartments in alternate embodiments. In embodiments with a container having two or more compartments, the contents of the different compartments may or may not the same. In some embodiments, the single dose pack is formulated and configured for cleaning laundry, but other cleaning purposes are also possible. The fabric treatment composition is positioned within the container, and the container is sealed to encase and enclose the wash composition. The fabric treatment composition is typically in direct contact with the film of the container within the single dose pack. The film of the container is sealable by heat, heat and water, ultrasonic methods, or other techniques, and one or more sealing techniques may be used to enclose the fabric treatment composition within the container.

In an exemplary embodiment, the fabric treatment composition is liquid when encapsulated within the container. It is desirable that the viscosity of the liquid composition, when diluted with water not be excessive, such that the liquid composition is able to fully dissolve in wash water, and further that it does not cause any problems in terms of operation of the washing machine. In this regard, it is desirable that the yield stress of the liquid composition is less than 10 Pa, preferably less than 5 Pa, and that the storage modulus is less than 50 Pa, preferably less than 30 Pa.

In an exemplary embodiment, the single dose pack is sized to provide a desired quantity of fabric treatment composition for one load of laundry. The single dose pack may also be sized for a fraction of a desired quantity, such as one half of a load of laundry, so a user can adjust the amount of fabric treatment added without having to split a single dose pack. In an exemplary embodiment, the single dose pack has a weight of from about 15 to about 50 grams. In alternate embodiments, the single dose pack is from about 15 to about 40 grams, or from about 17 to about 30 grams.

In some aspects, a fabric treatment unit dose product further comprises a second water-soluble compartment enclosing a solid composition. In some aspects, the solid composition is a powder composition. In some aspects, the powder composition is a cleaning composition. In some aspects the cleaning composition comprises one or more surfactants, a bleach, an anti-redeposition polymer, an optical brightener, or a combination thereof.

In some aspects, the fabric treatment product is a scent booster.

Fabric Treatment Composition

A plurality of components are combined to form a fabric treatment composition, where the fabric treatment composition is typically prepared prior to encapsulating within a unit dose pack container. The film remains structurally sound and intact prior to use of the single dose pack, where the single dose pack is immersed in a large quantity of water in use. A "large" quantity of water is at least about 100 times the weight of the single dose pack. For example, a single dose pack having a weight of from about 5 to about 50 grams may be immersed in from about 5 to about 50 liters of water in use. As used herein, "structurally sound" means the container and the film do not rupture or leak under typical storage conditions, such as about 0.5 to about 1.5 atmospheres of pressure, temperatures of about −10 to about 35° C., and a relative humidity of about 1 to about 80% for a period of at least 1 week. Structurally sound also means the container and the film are not tacky or sticky to the touch. The fabric treatment composition can also be provided as a liquid composition that is not enclosed in a unit dose pack.

In accordance with the present disclosure, the fabric treatment composition includes a synergistic combination of alcohol ethoxylate nonionic surfactant ("AE") and a structuring polymer, preferably a HASE polymer, to stabilize and enhance rheological properties of encapsulated fragrance slurry in a liquid composition for a unit dose pack, i.e., having less than 40% water, preferably less than 30% water. In certain preferred embodiments, the composition contains less than 25%, or less than 20% by weight water.

Typically, water is included from about 5 to about 40 weight percent by weight of the wash composition, from about 8 to about 30 weight percent, or from about 10 to about 25 weight percent. Water may be added to the fabric treatment composition directly or as a component of other ingredients, or directly and as a component of other ingredients. Non-aqueous solvent will typically make up a significant portion of the liquid composition as well.

As initially noted above, it has been discovered that the inclusion of a combination of AE and rheology modifier polymer is able to stabilize unit dose liquid compositions containing encapsulated fragrance slurry. The liquid composition has a yield stress and storage modulus G' that is lower than a comparable composition having no AE.

In some aspects, the liquid composition does not separate into more than one layer for at least four weeks at room temperature. In some aspects, the liquid composition does not separate into more than one layer for at least one week at 40° C. In some aspects, the liquid composition does not separate into more than one layer for at least four weeks at 40° C. In some aspects, the liquid composition does not separate into more than one layer for at least one week at 54° C.

In some aspects, the liquid composition has an initial yield stress less than 3 and a yield stress less than 3 Pa after storage for 1 week at 40° C. In some aspects, the liquid composition has a yield stress less than 30 Pa after storage for 1 week at 54° C. The yield stresses are measured with a rotational rheometer from TA Instruments, type HR20 at 25° C. This is a controlled shear stress rheometer. Various methods for measuring a yield stress with a controlled shear stress rheometer are described in the literature and known to the person skilled in the art. In the context of the present invention, the yield stress was determined using Oscillation Amplitude Linear Sweep from 0.1 Pa to 1010 Pa and the element used was Cone SST ST 40MM2DEG SMART-SWAP HRx0 511406.945.

In some aspects, the liquid composition has an initial storage modulus G' of less than 6 Pa and a storage modulus less than 9 Pa after storage for 1 week at 40° C. The G' are measured with a rotational rheometer from TA Instruments, type HR20 at 25° C. using oscillating deformation. For this purpose, the linear viscoelastic region is first determined in a stress sweep experiment. In this case, the shear stress amplitude is increased at a constant frequency of, for example, 1 Hz. The moduli G' is plotted in a log-log plot. Either the shear stress amplitude or the (resulting) deformation amplitude can be plotted on the x axis. The storage modulus G' is constant below a certain shear stress amplitude or deformation amplitude, above which it collapses. The break point is expediently determined by applying tangents to the two parts of the curve. The corresponding deformation amplitude or shear stress amplitude is usually referred to as "critical deformation" or "critical shear stress."

In order to determine the frequency dependence of the moduli, a frequency ramp, e.g. between 0.01 Hz and 10 Hz, is performed at a constant deformation amplitude. The deformation amplitude has to be selected such that it is within the linear range, i.e. below the above-mentioned critical deformation. In the case of the compositions according to the invention, a deformation amplitude of 0.1% has been found to be suitable. The moduli G' and G" are plotted against the frequency in a log-log plot.

Encapsulated Fragrance

The fabric treatment composition contains one or more encapsulated fragrances. Examples of encapsulated fragrances are described in, for example, U.S. Pat. Nos. 6,024,943, 6,056,949, 6,194,375, 6,458,754 and 8,426,353, and US 2011/0224127 A1 and US 2017/0121648, each of which is incorporated by reference in its entirety.

Encapsulation of fragrances prevents the fragrance from being released prematurely. The encapsulation may be ruptured at some time period after application to the garment, so fresh fragrance may be provided significantly after a garment is removed from a washing machine. The encapsulation may be ruptured by a wide variety of activities, such as physical contact from movement, melting, degradation from sunlight, degradation from oxidation, or other reasons. The encapsulation may be formed by aminoplast or cross-linked gelatin, polymeric materials, or other materials.

Encapsulated fragrance is typically prepared or commercially provided as an encapsulated fragrance slurry. Examples of such encapsulated fragrancy slurry products may contain 40-70% water and 30-60% encapsulated fragrance and fragrance encapsulate. Some encapsulated fragrance slurries may further contain various polymers to keep the product suspended.

In some aspects, provided herein is a liquid composition comprising from about 10% by weight to about 80% by weight of an encapsulated fragrance slurry. In some aspects, provided herein is a liquid composition comprising from about 20% by weight to about 70% by weight of an encapsulated fragrance slurry. In some aspects, provided herein is a liquid composition comprising from about 20% by weight to about 60% by weight of an encapsulated fragrance slurry. In some aspects, provided herein is a liquid composition comprising from about 20% by weight to about 50% by weight of an encapsulated fragrance slurry. In some aspects, provided herein is a liquid composition comprising from about 20% by weight to about 40% by weight of an encapsulated fragrance slurry. In some aspects, provided herein is a liquid composition comprising from about 20% by weight to about 30% by weight of an encapsulated fragrance slurry. In some aspects, provided herein is a liquid composition comprising from about 30% by weight to about 70% by weight of an encapsulated fragrance slurry. In some aspects, provided herein is a liquid composition comprising from about 40% by weight to about 70% by weight of an encapsulated fragrance slurry. In some aspects, provided herein is a liquid composition comprising from about 50% by weight to about 70% by weight of an encapsulated fragrance slurry. In some aspects, provided herein is a liquid composition comprising from about 60% by weight to about 70% by weight of an encapsulated fragrance slurry. In some aspects, provided herein is a liquid composition comprising from about 30% by weight to about 40% by weight of an encapsulated fragrance slurry.

In some aspects, the liquid composition comprises about 10% by weight, about 20% by weight, about 30% by weight, about 40% by weight, about 50% by weight, about 60% by weight, about 70% by weight, about 80% by weight or a range between any two of the preceding values of an encapsulated fragrance slurry. In some aspects, the liquid composition comprises about 40% by weight of an encapsulated fragrance slurry.

In some aspects, the encapsulated fragrance liquid slurry comprises from about 20% by weight to about 40% by weight of microcapsules. In some aspects, the encapsulated fragrance liquid slurry comprises from about 25% by weight to about 40% by weight of microcapsules. In some aspects, the encapsulated fragrance liquid slurry comprises from about 30% by weight to about 40% by weight of microcapsules. In some aspects, the encapsulated fragrance liquid slurry comprises from about 35% by weight to about 40% by weight of microcapsules. In some aspects, the encapsulated fragrance liquid slurry comprises from about 20% by weight to about 35% by weight of microcapsules. In some aspects, the encapsulated fragrance liquid slurry comprises from about 20% by weight to about 30% by weight of microcapsules. In some aspects, the encapsulated fragrance liquid slurry comprises from about 20% by weight to about 25% by weight of microcapsules. In some aspects, the encapsulated fragrance liquid slurry comprises from about 25% by weight to about 35% by weight of microcapsules.

In some aspects, the encapsulated fragrance liquid slurry comprises about 20% by weight, about 25% by weight, about 30% by weight, about 35% by weight, about 40% by weight, or a range between any two of the preceding values of microcapsules.

In some aspects, the microcapsules comprise a shell. In some aspects, the shell encapsulates a core material. In some aspects, the core material of the microcapsules includes one or more perfume oils. In some aspects, the shell of the microcapsules is made from synthetic polymeric materials or naturally-occurring polymers. The microcapsules may be any kind of microcapsule disclosed herein or known in the art. In some aspects, the synthetic polymers are derived from petroleum oil, for example. Non-limiting examples of synthetic polymers include nylon, polyethylenes, polyamides, polystyrenes, polyisoprenes, polycarbonates, polyesters, polyureas, polyurethanes, polyureaurethane, polyolefins, polysaccharides, epoxy resins, vinyl polymers, polyacrylates, gelatin, shellac, water insoluble inorganics, silicone, and mixtures thereof. Natural polymers occur in nature and may often be extracted from natural materials. Non-limiting examples of naturally occurring polymers are silk, wool, gelatin, cellulose, proteins, and combinations thereof.

In some aspects, the mean particle size of microcapsules is between about 1 to about 100 microns. In some aspects, the mean particle size of microcapsules is between about 5 to about 100 microns. In some aspects, the mean particle size of microcapsules is between about 10 to about 100 microns. In some aspects, the mean particle size of microcapsules is between about 20 to about 100 microns. In some aspects, the mean particle size of microcapsules is between about 30 to about 100 microns. In some aspects, the mean particle size of microcapsules is between about 40 to about 100 microns. In some aspects, the mean particle size of microcapsules is between about 50 to about 100 microns. In some aspects, the mean particle size of microcapsules is between about 60 to about 100 microns. In some aspects, the mean particle size of microcapsules is between about 70 to about 100 microns. In some aspects, the mean particle size of microcapsules is between about 80 to about 100 microns. In some aspects, the mean particle size of microcapsules is between about 90 to about 100 microns. In some aspects, the mean particle size of microcapsules is between about 1 to about 90 microns. In some aspects, the mean particle size of microcapsules is between about 1 to about 80 microns. In some aspects, the mean particle size of microcapsules is between about 1 to about 70 microns. In some aspects, the mean particle size of microcapsules is between about 1 to about 60 microns. In some aspects, the mean particle size of microcapsules is between about 1 to about 50 microns. In some aspects, the mean particle size of microcapsules is between about 1 to about 40 microns. In some aspects, the mean particle size of microcapsules is between about 1 to about 30 microns. In some aspects, the mean particle size of microcapsules is between about 1 to about 20 microns. In some aspects, the mean particle size of microcapsules is between about 1 to about 10 microns. In some aspects, the mean particle size of microcapsules is between about 1 to about 5 microns.

In some aspects, the mean particle size of microcapsules is about 1 micron, about 5 microns, about 10 microns, about 20 microns, about 30 microns, about 40 microns, about 50 microns, about 60 microns, about 70 microns, about 80 microns, about 90 microns, about 100 microns, or a range between any two of the preceding values.

In one preferred embodiment, an encapsulated fragrance slurry contains or consists of about 61% water and about 39% fragrance in a microcapsule encapsulate, and a suspending polymer.

Rheology Modifier

The fabric care compositions further require the benefit of a rheology modifier/suspending agent in order to produce stable suspensions that can be readily prepared, transferred, and held in the unit dose manufacturing process.

Accordingly, the fabric care composition further comprises a suspending polymer selected from the group consisting of a water-soluble polymer, a water-dispersible polymer, and any combination thereof. In some embodiments, the suspending polymer is selected from the group consisting of a hydrophobically-modified alkali swellable emulsion polymer (HASE), an alkali swellable emulsion polymer (ASE), a cationic polymer, an anionic polysaccharide polymer, and any combination thereof.

In some embodiments, the suspending polymer is either a hydrophobically-modified alkali swellable emulsion polymer (HASE), or an alkali soluble emulsion polymer (ASE).

In some embodiments, the hydrophobically-modified alkali swellable emulsion polymer (HASE) is, for example, CARBOPOL EZ-4, CARBOPOL EDT 2623, ACULYN 88, ACUSOL 801S, ACUSOL MILLENNIUM, RHEOVIS AT-120, or any combination thereof.

In some embodiments, the alkali swellable emulsion polymer (ASE) is, for example, a cross-linked acrylic, polymer dispersion, a cross-linked polyacrylate powder, an alkali-swellable anionic acrylic polymer emulsion, a cross-linked acrylic acid homopolymer, or any combination thereof. In some embodiments, the alkali swellable emulsion polymer (ASE) is a cross-linked acrylic polymer dispersion.

In some embodiments, the cationic polymer is selected from the group consisting of a polyacrylate-1 crosspolymer, a cationic acrylic polymer, diethylesterdimethylammonium chloride and any combination thereof. In some embodiments, the anionic polysaccharide polymer is selected from the group consisting of guar gum, diutan gum, xanthan gum, and any combination thereof.

The suspending polymer desirably is selected from the group consisting of a hydrophobically-modified alkali swellable emulsion polymer (HASE), an alkali swellable emulsion polymer (ASE), a cationic polymer, an anionic polysaccharide polymer, and any combination thereof. Most preferably, the suspending polymer is a HASE; and comprises about 0.01 wt. % to about 3.0 wt. % of the treatment composition, more preferably the amount of HASE is about 1.5 to about 3.5% by weight of the wash composition.

In some aspects, the rheology modifier is an acrylic copolymer, an Alkali Soluble Emulsion (ASE) polymer or a Hydrophobically Modified Alkali Soluble Emulsion (HASE) polymer.

In some aspects, the rheology modifier is a HASE polymer. In some aspects, the HASE polymer has the following structure:

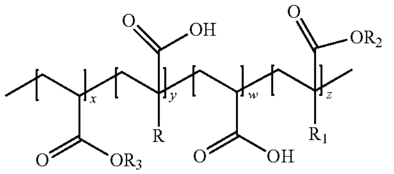

wherein R, R1 and R3 are independently selected from H and alkyl groups, wherein R2 is an optionally alkoxylated alkyl group, and wherein w, x, y and z are integers.

In some aspects, R, $R_1$ and $R_3$ are independently selected from $C_1$-$C_{10}$ alkyl groups, $R_2$ is an ethoxylated $C_1$-$C_{20}$alkyl group and $R_3$ is selected from H and $C_1$-$C_6$ alkyl groups. In some aspects, R and $R_1$ are methyl groups, $R_2$ is an ethoxylated $C_8$-$C_{20}$alkyl group and $R_3$ is an ethyl group. In some aspects, the repeating units comprising R, $R_1$, $R_2$ and $R_3$ can be in any suitable order, or even randomly distributed through the polymer chain.

In some aspects, the HASE polymer can have a molecular weight of between about 50,000 to about 500,000 g/mol, between about 80,000 to about 400,000 g/mol, between about 100,000 to about 300,000 g/mol, between about 50,000 to about 450,000 g/mol, between about 50,000 to about 400,000 g/mol, between about 50,000 to about 350,000 g/mol, between about 50,000 to about 300,000 g/mol, between about 50,000 to about 250,000 g/mol, between about 50,000 to about 200,000 g/mol, between about 50,000 to about 150,000 g/mol, between about 50,000 to about 100,000 g/mol, between about 100,000 to about 500,000 g/mol, between about 150,000 to about 500,000 g/mol, between about 200,000 to about 500,000 g/mol, between about 250,000 to about 500,000 g/mol, between about 300,000 to about 500,000 g/mol, between about 350,000 to about 500,000 g/mol, between about 400,000 to about 500,000 g/mol, or between about 450,000 to about 500,000 g/mol. In some aspects, the HASE polymer has a molecular weight of about 50,000 g/mol, about 80,000 g/mol, about 100,000 g/mol, about 150,000 g/mol, about 200,000 g/mol, about 250,000 g/mol, about 300,000 g/mol, about 350,000 g/mol, about 400,000 g/mol, about 450,000 g/mol, about 500,000 g/mol, or a range between any two of the preceding values.

In some aspects, the ratio of x:y is between 1:20 to 20:1, between 1:10 to 10:1, or between 1:5 to 5:1. In some aspects, the ratio of x:w is between 1:20 to 20:1, between 1:10 to 10:1, or between 1:5 to 5:1. In some aspects, the ratio of x:z can be between 1:1 to 500:1, between 2:1 to 250:1, or between 25:1 to 75:1.

Methods of making such HASE polymer are described in U.S. Pat. Nos. 4,514,552, 5,192,592, British Patent No. 870,994, and U.S. Pat. No. 7,217,443, all of which are incorporated herein by reference.

In some aspects, the rheology modifier is an ASE polymer. In some aspects, the ASE polymer has the following structure:

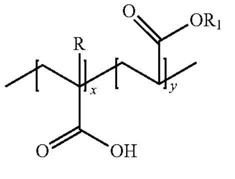

wherein R is selected from H and alkyl groups and $R_1$ is an alkyl group, and wherein x and y are integers.

In some aspects, R is selected from H and $C_1$-$C_{20}$alkyl groups and $R_1$ is a $C_1$-$C_{20}$ alkyl group.

In some aspects, the ratio of x:y is between 1:20 to 20:1, between 1:10 to 10:1, or between 1:5 to 5:1. In some aspects, the ratio of x:w is between 1:20 to 20:1, between 1:10 to 10:1, or between 1:5 to 5:1. In some aspects, the ratio of x:z is between 1:1 to 500:1, between 2:1 to 250:1, or between 25:1 to 75:1.

In some aspects, the ASE polymer has a molecular weight of between 50,000 to 500,000 g/mol, between 80,000 to 400,000 g/mol, between 100,000 to 300,000 g/mol, between about 50,000 to about 450,000 g/mol, between about 50,000 to about 400,000 g/mol, between about 50,000 to about 350,000 g/mol, between about 50,000 to about 300,000 g/mol, between about 50,000 to about 250,000 g/mol, between about 50,000 to about 200,000 g/mol, between about 50,000 to about 150,000 g/mol, between about 50,000 to about 100,000 g/mol, between about 100,000 to about 500,000 g/mol, between about 150,000 to about 500,000 g/mol, between about 200,000 to about 500,000 g/mol, between about 250,000 to about 500,000 g/mol, between about 300,000 to about 500,000 g/mol, between about 350,000 to about 500,000 g/mol, between about 400,000 to about 500,000 g/mol, or between about 450,000 to about 500,000 g/mol. In some aspects, the ASE polymer has a molecular weight of about 50,000 g/mol, about 80,000 g/mol, about 100,000 g/mol, about 150,000 g/mol, about 200,000 g/mol, about 250,000 g/mol, about 300,000 g/mol, about 350,000 g/mol, about 400,000 g/mol, about 450,000 g/mol, about 500,000 g/mol, or a range between any two of the preceding values.

In preferred embodiments, the rheology modifier does not comprise a cellulose and/or the composition contains no cellulose ingredients.

In some aspects, the liquid composition comprises from about 0.5% by weight to about 5.0% by weight of a rheology modifier. In some aspects, the liquid composition comprises from about 1.5% by weight to about 3.5% by weight of a rheology modifier. In some aspects, the liquid composition comprises from about 1.75% by weight to about 2.25% by weight of a rheology modifier. In some aspects, the liquid composition comprises about 0.5% by weight, about 0.6% by weight, about 0.7% by weight, about 0.8% by weight, about 0.9% by weight, about 1.0% by weight, about 1.5% by weight, about 2.0% by weight, about 2.5% by weight, about 3.0% by weight, about 3.5% by weight, about 4.0% by weight, about 4.5% by weight, about 5.0% by weight, or a range between any two of the preceding values of a rheology modifier. In some aspects, the liquid composition comprises about 2.0% by weight of a rheology modifier.

Alcohol Ethoxylate (AE)

The alcohol ethoxylate (AE) may be primary and secondary alcohol ethoxylates, especially the $C_8$-$C_{20}$ aliphatic alcohols ethoxylated with an average of from 1 to 20 moles of ethylene oxide per mole of alcohol, and more especially the $C_{10}$-$C_{15}$ primary and secondary aliphatic alcohols ethoxylated with an average of from 1 to 10 moles, or from 3 to 8 moles of ethylene oxide per mole of alcohol.

Exemplary AEs are the condensation products of aliphatic $C_8$-$C_{20}$, preferably $C_5$-$C_{16}$, primary or secondary, linear or branched chain alcohols with ethylene oxide. In some embodiments, the alcohol ethoxylates contain 1 to 20, or 3 to 8 ethylene oxide groups, and may optionally be end-capped by a hydroxylated alkyl group.

In one embodiment, the AE has Formula (XIV):

$$R_2—(—O—C_2H_4—)_m—OH \quad (XIV)$$

wherein $R_2$ is a hydrocarbyl group having 8 to 16 carbon atoms, 8 to 14 carbon atoms, 8 to 12 carbon atoms, or 8 to 10 carbon atoms; and m is from 1 to 20, or 3 to 8.

The hydrocarbyl group may be linear or branched, and saturated or unsaturated. In some embodiments, $R_2$ is a linear or branched $C_8$-$C_{16}$ alkyl or a linear group or branched $C_8$-$C_{16}$ alkenyl group. Preferably, $R_2$ is a linear or branched $C_5$-$C_{16}$ alkyl, $C_5$-$C_{14}$ alkyl, or $C_8$-$C_{10}$ alkyl group. In case (e.g., commercially available materials) where materials contain a range of carbon chain lengths, these carbon numbers represent an average. The alcohol may be derived from natural or synthetic feedstock. In one embodiment, the alcohol feedstock is coconut, containing predominantly $C_{12}$-$C_{14}$ alcohol, and oxo $C_{12}$-$C_{15}$ alcohols.

One suitable AE is Tomadol® 25-7 (available from Air Product). Other suitable AEs include Genapol® C200 (available from Clariant), which is a coco alcohol having an average degree of ethoxylation of 20.

The amount of AE in the wash composition ranges from about 3.75% by weight to about 8% by weight of the liquid composition. In some aspects, the liquid composition comprises about 3.75% by weight, about 4.0% by weight, about 4.25% by weight, about 4.5% by weight, about 4.75% by weight, about 5.0% by weight, about 5.25% by weight, about 5.5% by weight, about 5.75% by weight, about 6.0% by weight, about 6.25% by weight, about 6.5% by weight, about 6.75% by weight, about 7.0% by weight, about 7.25% by weight, about 7.50% by weight, about 7.75% by weight, about 8.0% by weight or a range between any two of the preceding values of an AE. In some aspects, the liquid composition comprises about 3.75% to about 5.25% by weight, more preferably about 4.0% to about 5.25% by weight, more preferably about 4.0% to about 5.0% by weight, most preferably about 4.5% to about 5.0% by weight of AE.

Polyethylene Glycol

In some aspects, the liquid composition comprises from about 5% by weight to about 70% by weight of a polyethylene glycol. In some aspects, the liquid composition comprises from about 10% by weight to about 60% by weight of a polyethylene glycol. In some aspects, the liquid composition comprises from about 20% by weight to about 60% by weight of a polyethylene glycol. In some aspects, the liquid composition comprises from about 20% by weight to about 50% by weight of a polyethylene glycol. In some aspects, the liquid composition comprises from about 25% by weight to about 50% by weight of a polyethylene glycol. In some aspects, the liquid composition comprises from about 30% by weight to about 50% by weight of a polyethylene glycol. In some aspects, the liquid composition comprises from about 35% by weight to about 50% by weight of a polyethylene glycol. In some aspects, the liquid composition comprises from about 40% by weight to about 50% by weight of a polyethylene glycol. In some aspects, the liquid composition comprises from about 45% by weight to about 50% by weight of a polyethylene glycol. In some aspects, the liquid composition comprises from about 20% by weight to about 45% by weight of a polyethylene glycol. In some aspects, the liquid composition comprises from about 20% by weight to about 40% by weight of a polyethylene glycol. In some aspects, the liquid composition comprises from about 20% by weight to about 35% by weight of a polyethylene glycol. In some aspects, the liquid composition comprises from about 20% by weight to about 30% by weight of a polyethylene glycol. In some aspects, the liquid composition comprises from about 20% by weight to about 25% by weight of a polyethylene glycol.

In some aspects, the liquid composition comprises about 5% by weight, about 10% by weight, about 15% by weight, about 20% by weight, about 25% by weight, about 30% by weight, about 35% by weight, about 40% by weight, about 45% by weight, about 50% by weight, about 55% by weight, about 60% by weight, about 65% by weight, about 70% by weight, about 75% by weight, about 80% by weight, or a range between any of two the preceding values of a polyethylene glycol. In some aspects, the liquid composition comprises about 35% by weight of a polyethylene glycol.

In some aspects, the polyethylene glycol has a molecular weight between about 200 and about 1000 Daltons. In some aspects, the polyethylene glycol has a molecular weight between about 300 and about 1000 Daltons. In some aspects, the polyethylene glycol has a molecular weight between about 400 and about 1000 Daltons. In some aspects, the polyethylene glycol has a molecular weight between about 500 and about 1000 Daltons. In some aspects, the polyethylene glycol has a molecular weight between about 600 and about 1000 Daltons. In some aspects, the polyethylene glycol has a molecular weight between about 700 and about 1000 Daltons. In some aspects, the polyethylene glycol has a molecular weight between about 800 and about 1000 Daltons. In some aspects, the polyethylene glycol has a molecular weight between about 900 and about 1000 Daltons. In some aspects, the polyethylene glycol has a molecular weight between about 200 and about 900 Daltons. In some aspects, the polyethylene glycol has a molecular weight between about 200 and about 800 Daltons. In some aspects, the polyethylene glycol has a molecular weight between about 200 and about 700 Daltons. In some aspects, the polyethylene glycol has a molecular weight between about 200 and about 600 Daltons. In some aspects, the polyethylene glycol has a molecular weight between about 200 and about 500 Daltons. In some aspects, the polyethylene glycol has a molecular weight between about 200 and about 400 Daltons. In some aspects, the polyethylene glycol has a molecular weight between about 200 and about 300 Daltons. In some aspects, the polyethylene glycol has a molecular weight between about 300 and about 500 Daltons. In some aspects, the polyethylene glycol has a molecular weight between about 200 and about 400 Daltons. In some aspects, the polyethylene glycol has a molecular weight between about 400 and about 1000 Daltons.

In some aspects, the polyethylene glycol has a molecular weight of about 200 Daltons, about 300 Daltons, about 400 Daltons, about 500 Daltons, about 600 Daltons, about 700 Daltons, about 800 Daltons, about 900 Daltons, about 1000 Daltons, or a range between any two of the preceding values. In some aspects, the polyethylene glycol has a molecular weight of about 400 Daltons.

pH Adjusting Agent

The fabric treatment composition preferably includes a pH adjusting agent to create a slightly alkaline environment for the suspending polymer to swell and form a structure therefore maintaining stable encapsulated fragrance suspension.

Triethanolamine is an example of a strongly alkaline substance used as pH adjusting agent. Alternative pH adjusting materials are monoethanolamine, tromethamine, sodium carbonate, sodium bicarbonate, sodium borate, amino-based chelants (e.g. DTPA, EDTA, MGDA, IDS, EDDS, GLDA).

In some aspects, the pH adjusting agent is selected from the group consisting of triethanolamine, monoethanolamine, tromethamine, sodium carbonate, sodium bicarbonate, sodium borate, diethylenetriaminepentaacetic acid (DTPA), ethylenediaminetetraacetic acid (EDTA), methylglycinediacetic acid (MGDA), iminodisuccinic acid (IDS), ethylenediamine-N,N'-disuccinic acid (EDDS), and tetrasodium glutamate diacetate (GLDA).

In some aspects, the liquid composition comprises from about 0.01% by weight to about 5% by weight of a pH adjusting agent. In some aspects, the liquid composition comprises from about 0.05% by weight to about 4% by weight of a pH adjusting agent. In some aspects, the liquid composition comprises from about 0.1% by weight to about 3% by weight of a pH adjusting agent. In some aspects, the liquid composition comprises from about 0.2% by weight to about 3% by weight of a pH adjusting agent. In some aspects, the liquid composition comprises from about 0.3% by weight to about 3% by weight of a pH adjusting agent. In some aspects, the liquid composition comprises from about 0.4% by weight to about 3% by weight of a pH adjusting agent. In some aspects, the liquid composition comprises from about 0.5% by weight to about 3% by weight of a pH adjusting agent. In some aspects, the liquid composition comprises from about 1.0% by weight to about 3% by weight of a pH adjusting agent. In some aspects, the liquid composition comprises from about 1.5% by weight to about 3% by weight of a pH adjusting agent. In some aspects, the liquid composition comprises from about 2.0% by weight to about 3% by weight of a pH adjusting agent. In some aspects, the liquid composition comprises from about 2.5% by weight to about 3% by weight of a pH adjusting agent. In some aspects, the liquid composition comprises from about 0.1% by weight to about 2.5% by weight of a pH adjusting agent. In some aspects, the liquid composition comprises from about 0.1% by weight to about 2% by weight of a pH adjusting agent. In some aspects, the liquid composition comprises from about 0.1% by weight to about 1.5% by weight of a pH adjusting agent. In some aspects, the liquid composition comprises from about 0.1% by weight to about 1% by weight of a pH adjusting agent. In some aspects, the liquid composition comprises from about 0.1% by weight to about 0.5% by weight of a pH adjusting agent. In some aspects, the liquid composition comprises from about 0.1% by weight to about 0.4% by weight of a pH adjusting agent. In some aspects, the liquid composition comprises from about 0.1% by weight to about 0.3% by weight of a pH adjusting agent. In some aspects, the liquid composition comprises from about 0.1% by weight to about 0.2% by weight of a pH adjusting agent.

In some aspects, the liquid composition comprises about 0.01% by weight, about 0.1% by weight, about 0.2% by weight, about 0.3% by weight, about 0.4% by weight, about 0.5% by weight, about 1% by weight, about 1.5% by weight, about 2% by weight, about 2.5% by weight, about 3% by weight, about 3.5% by weight, about 4% by weight, about 4.5% by weight, about 5% by weight, or a range between any two of the preceding values of a pH adjusting agent. In some aspects, the liquid composition comprises about 0.8% of a pH adjusting agent.

Non-Aqueous Solvent

The liquid fabric treatment composition will also include at least one non-aqueous solvent. Non-aqueous solvents that may be included in the wash composition are glycerol, propylene glycol, ethylene glycol, ethanol, and 4C+ compounds. The term "4C+ compound" refers to one or more of: polypropylene glycol; polyethylene glycol esters such as polyethylene glycol stearate, propylene glycol laurate, and/or propylene glycol palmitate; methyl ester ethoxylate; diethylene glycol; dipropylene glycol; sorbitol; tetramethylene glycol; butylene glycol; pentanediol; hexylene glycol; heptylene glycol; octylene glycol; 2-methyl, 1,3 propanediol; xylitol; mannitol; erythritol; dulcitol; inositol; adonitol; triethylene glycol; polypropylene glycol; glycol ethers, such as ethylene glycol monobutyl ether, diethylene glycol monobutyl ether, triethylene glycol monobutyl ether, ethylene glycol monopropyl ether, diethylene glycol monoethyl ether, triethylene glycol monoethyl ether, diethylene glycol monomethyl ether, and triethylene glycol monomethyl ether; tris (2-hydroxyethyl)methyl ammonium methylsulfate; ethylene oxide/propylene oxide copolymers with a number average molecular weight of 3,500 Daltons or less; and ethoxylated fatty acids. These optional non-aqueous solvents may be included in amounts, individually, of anywhere from about 1 weight percent to about 30 weight percent.

In some aspects, the liquid composition comprises from about 5% by weight to about 60% by weight, more preferably about 10% by weight to about 50% by weight, more preferably about 14% by weight to about 35% by weight, most preferably about 19% by weight to about 24% by weight of non-aqueous solvent.

In some aspects, the liquid composition comprises a first non-aqueous solvent and a second non-aqueous solvent that is different in composition from the first non-aqueous solvent.

In some aspects, a first non-aqueous solvent is selected from the group consisting of ethylene glycol, glycerin, propylene glycol, ethanol, dipropylene glycol, and tripropylene glycol methyl ether. In some aspects, the first non-aqueous solvent is glycerin.

In some aspects, the liquid composition comprises from about 3% by weight to about 40% by weight of a first non-aqueous solvent. In some aspects, the liquid composition comprises from about 5% by weight to about 25% by weight of a first nonaqueous solvent. In some aspects, the liquid composition comprises from about 8% by weight to about 18% by weight of a first non-aqueous solvent. In some aspects, the liquid composition comprises from about 14% by weight to about 18% by weight of a first nonaqueous solvent. In some aspects, the liquid composition comprises from about 15% by weight to about 30% by weight of a first non-aqueous solvent. In some aspects, the liquid composition comprises from about 20% by weight to about 30% by weight of a first nonaqueous solvent. In some aspects, the liquid composition comprises from about 25% by weight to about 30% by weight of a first non-aqueous solvent. In some aspects, the liquid composition comprises from about 8% by weight to about 25% by weight of a first nonaqueous solvent. In some aspects, the liquid composition comprises from about 8% by weight to about 20% by weight of a first non-aqueous solvent. In some aspects, the liquid composition comprises from about 8% by weight to about 15% by weight of a first nonaqueous solvent. In some aspects, the liquid composition comprises from about 8% by weight to about 10% by weight of a first non-aqueous solvent.

In some aspects, the liquid composition comprises about 3% by weight, about 5% by weight, about 8% by weight, about 10% by weight, about 15% by weight, about 20% by weight, about 25% by weight, about 30% by weight, about 35% by weight, about 40% by weight, or a range between any two of the preceding values of a first non-aqueous solvent. In some aspects, the liquid composition comprises about 16% of a first non-aqueous solvent.

In some aspects, the second non-aqueous solvent is selected from the group consisting of ethylene glycol, glycerin, propylene glycol, ethanol, dipropylene glycol, and tripropylene glycol methyl ether. In some aspects, the second non-aqueous solvent is propylene glycol. In some aspects, the liquid composition does not contain a second nonaqueous solvent.

In some aspects, the liquid composition comprises from about 0% by weight to about 30% by weight of a second non-aqueous solvent. In some aspects, the liquid composition comprises from about 0% by weight to about 20% by weight of a second nonaqueous solvent. In some aspects, the liquid composition comprises from about 0% by weight to about 15% by weight of a second non-aqueous solvent. In some aspects, the liquid composition comprises from about 1% by weight to about 15% by weight of a second non-aqueous solvent. In some aspects, the liquid composition comprises from about 2% by weight to about 15% by weight of a second non-aqueous solvent. In some aspects, the liquid composition comprises from about 3% by weight to about 15% by weight of a second nonaqueous solvent. In some aspects, the liquid composition comprises from about 4% by weight to about 15% by weight of a second non-aqueous solvent. In some aspects, the liquid composition comprises from about 5% by weight to about 10% by weight of a second nonaqueous solvent. In some aspects, the liquid composition comprises from about 8% by weight to about 9% by weight of a second non-aqueous solvent. In some aspects, the liquid composition comprises from about 10% by weight to about 15% by weight of a second nonaqueous solvent. In some aspects, the liquid composition comprises from about 12% by weight to about 15% by weight of a second non-aqueous solvent. In some aspects, the liquid composition comprises from about 1% by weight to about 12% by weight of a second nonaqueous solvent. In some aspects, the liquid composition comprises from about 1% by weight to about 10% by weight of a second non-aqueous solvent. In some aspects, the liquid composition comprises from about 1% by weight to about 8% by weight of a second nonaqueous solvent. In some aspects, the liquid composition comprises from about 1% by weight to about 5% by weight of a second non-aqueous solvent. In some aspects, the liquid composition comprises from about 1% by weight to about 4% by weight of a second non-aqueous solvent. In some aspects, the liquid composition comprises from about 1% by weight to about 3% by weight of a second non-aqueous solvent. In some aspects, the liquid composition comprises from about 1% by weight to about 2% by weight of a second nonaqueous solvent. In some aspects, the liquid composition comprises 0% by weight of a second non-aqueous solvent.

In some aspects, the liquid composition comprises about 0% by weight, about 5% by weight, about 10% by weight, about 15% by weight, about 20% by weight, about 25% by weight, about 30% by weight, or a range between any two of the preceding values of a second non-aqueous solvent. In some aspects, the liquid composition comprises about 8.0% of a second non-aqueous solvent.

Other Ingredients

The fabric treatment composition may include other components as well. In some embodiments, the fabric treatment composition may include an ionic detergent surfactant, where the ionic detergent surfactant is formulated for laundry. The ionic detergent surfactant may include one or more surfactants, including cationic and/or anionic surfactants. The ionic detergent surfactant may be present in the composition at a concentration of from about 0 to about 55 weight percent, or about 10 to about 30 weight percent, or from about 20 to about 25 weight percent, where weight percentages are based on a total weight of the fabric treatment composition.

Suitable ionic detergent surfactants that are anionic include soaps which contain sulfate or sulfonate groups, including those with alkali metal ions as cations. Usable soaps include alkali metal salts of saturated or unsaturated fatty acids with 12 to 18 carbon (C) atoms. Such fatty acids may also be used in incompletely neutralized form. Usable ionic detergent surfactants of the sulfate type include the salts of sulfuric acid semi esters of fatty alcohols with 12 to 18 C atoms, and/or alcohol ethoxysulfates. Usable ionic detergent surfactants of the sulfonate type include alkane sulfonates with 12 to 18 C atoms and olefin sulfonates with 12 to 18 C atoms, such as those that arise from the reaction of corresponding mono-olefins with sulfur trioxide, alpha-sulfofatty acid esters such as those that arise from the sulfonation of fatty acid methyl or ethyl esters, and lauryl ether sulfates. In preferred embodiments, the liquid fabric treatment composition does not contain an anionic surfactant.

Suitable ionic detergent surfactants that are cationic may include textile-softening substances of the general formula X, XI, or XII as illustrated below:

(X)

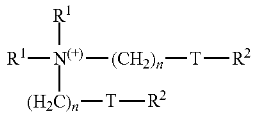

(XI)

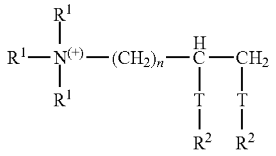

(XII)

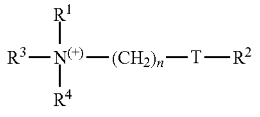

in which each $R^1$ group is mutually independently selected from among $C_1$-6 alkyl, alkenyl or hydroxyalkyl groups; each $R^2$ group is mutually independently selected from among $C_{8-28}$ alkyl or alkenyl groups; $R^3$=$R^1$ or $(CH_2)_n$-T-$R^2$, $R^4$=$R^1$ or $R^2$ or $(CH_2)_n$-T-$R^2$, T=—$CH_2$—, —O—CO—, or —CO—O—, and n is an integer from 0 to 5. The ionic detergent surfactants that are cationic may include conventional anions of a nature and number required for charge balancing. Alternatively, the ionic detergent surfactant may include anionic detergent surfactants that may function to balance the charges with the cationic detergent surfactants. In some embodiments, ionic detergent surfactants that are cations may include hydroxyalkyltrialkylammonium compounds, such as $C_{12-18}$ alkyl(hydroxyethyl) dimethyl ammonium compounds, and may include the halides thereof, such as chlorides or other halides. The ionic detergent surfactants that are cations may be especially useful for compositions intended for treating textiles.

Examples of optional nonionic surfactants suitable for the present invention include, but are not limited to, polyalkoxylated alkanolamides, polyoxyalkylene alkyl ethers, polyoxyalkylene alkylphenyl ethers, polyoxyalkylene sorbitan fatty acid esters, polyoxyalkylene sorbitol fatty acid esters, polyoxyethylene polyoxypropylene alkyl ethers, polyoxyalkylene castor oils, polyoxyalkylene alkylamines, glycerol fatty acid esters, alkylglucosamides, alkylglucosides, alkylamine oxides, amine oxide surfactants, alkoxylated fatty alcohols, or a mixture thereof.

Several other components may optionally be added to and included in the composition, including but not limited to enzymes, peroxy compounds, bleach activators, anti-redeposition agents, neutralizers, optical brighteners, foam inhibitors, chelators, bittering agents, dye transfer inhibitors, soil release agents, water softeners, and other components. A partial, non-exclusive list of additional components (not illustrated) that may be added to and included in the composition includes electrolytes, graying inhibitors, anti-crease components, bleach agents, colorants, scents, processing aids, antimicrobial agents, and preservatives.

Possible enzymes that may be in the composition contemplated herein include one or more of a protease, lipase, cutinase, amylase, carbohydrase, cellulase, pectinase, mannanase, arabinase, galactanase, xylanase, oxidase, (e.g., a laccase), and/or peroxidase, but others are also possible. In general, the properties of the selected enzyme(s) should be compatible with the selected composition, (i.e., pH-optimum, compatibility with other enzymatic and non-enzymatic ingredients, etc.). The detergent enzyme(s) may be included in the composition by adding separate additives containing one or more enzymes, or by adding a combined additive comprising all the enzymes that are added to the composition. The enzyme(s) should be present in the composition in effective amounts, such as from about 0 weight percent to about 5 weight percent of enzyme, or from about 0.001 to about 1 weight percent, or from about 0.2 to about 2 weight percent, or from about 0.5 to about 1 weight percent, based on the total weight of the fabric treatment composition, in various embodiments.

A peroxy compound may optionally be present in the composition. Exemplary peroxy compounds include organic peracids or peracidic salts of organic acids, such as phthalimidopercaproic acid, perbenzoic acid or salts of diperdodecanedioic acid, hydrogen peroxide and inorganic salts that release hydrogen peroxide under the washing conditions, such as perborate, percarbonate and/or persilicate. Hydrogen peroxide may also be produced with the assistance of an enzymatic system, i.e. an oxidase and its substrate. Other possible peroxy compounds include alkali metal percarbonates, alkali metal perborate monohydrates, alkali metal perborate tetrahydrates or hydrogen peroxide. Peroxy compounds may be present in the composition at an amount of from about 0 to about 50 weight percent, or an amount of from about 3 to about 30 weight percent, or an amount of from about 3 to about 10 weight percent, based on the total weight of the fabric treatment composition, in various embodiments.

Bleach activators may optionally be added and included in the composition. Conventional bleach activators that form peroxycarboxylic acid or peroxyimidic acids under perhydrolysis conditions and/or conventional bleach-activating transition metal complexes may be used. The bleach activator optionally present may include, but is not limited to, one or more of: N- or O-acyl compounds, for example polyacylated alkylenediamines, such as tetraacetylethylenediamine; acylated glycolurils, such as tetraacetylglycoluril; N-acylated hydantoins; hydrazides; triazoles; urazoles; diketopiperazines; sulfurylamides and cyanurates; carboxylic anhydrides, such as phthalic anhydride; carboxylic acid esters, such as sodium isononanoylphenolsulfonate; acylated sugar derivatives, such as pentaacetyl glucose; and cationic nitrile derivatives such as trimethylammonium acetonitrile salts.

To avoid interaction with peroxy compounds during storage, the bleach activators may be coated with shell substances or granulated prior to addition to the composition, in a known manner. As such, the bleach activator and/or other components may be present in a liquid composition as a free or floating particulate. Exemplary embodiments of the coating or shell substance include tetraacetylethylenediamine granulated with the assistance of carboxymethylcellulose and having an average grain size of 0.01 mm to 0.8 mm, granulated 1,5-diacetyl-2,4-dioxohexahydro-1,3,5-triazine, and/or trialkylammonium acetonitrile formulated in particulate form. In alternative embodiments, the bleach activators may be enclosed in a compartment, separate from the compartment that contains peroxy compounds and/or other compounds of the composition. In various embodiments, the bleach activators may be present in the composition in quantities of from about 0 to about 8 weight percent, or from about 0 to about 6 weight percent, or from about 0 to about 4 weight percent, in each case relative to the total weight of the fabric treatment composition.

One or more anti-redeposition agents may also be optionally included in the wash composition. Anti-redeposition agents include polymers with a soil detachment capacity, which are also known as "soil repellents" due to their ability to provide a soil-repelling finish on the treated surface, such as a fiber. Anti-redeposition agents include polymers with a soil detachment capacity. One example in regard to polyesters includes copolyesters prepared from dicarboxylic acids, such as adipic acid, phthalic acid or terephthalic acid. In an exemplary embodiment, an anti-redeposition agents includes polyesters with a soil detachment capacity that include those compounds which, in formal terms, are obtainable by esterifying two monomer moieties, the first monomer being a dicarboxylic acid HOOC—Ph—COOH and the second monomer a diol HO—($CHR^{11}$—)aOH, which may also be present as a polymeric diol H—(O—($CHR^{11}$—$)_a)_b$OH. Ph here means an ortho-, meta- or para-phenylene residue that may bear 1 to 4 substituents selected from alkyl residues with 1 to 22 C atoms, sulfonic acid groups, carboxyl groups and mixtures thereof. $R^{11}$ means hydrogen or an alkyl residue with 1 to 22 C atoms and mixtures thereof. "a" means a number from 2 to 6 and "b" means a number from 1 to 300. The polyesters obtainable therefrom may contain not only monomer diol units —O—($CHR^{11}$—$)_n$O— but also polymer diol units —(O—($CHR^{11}$—$)_a)_b$O—. The molar ratio of monomer diol units to polymer diol units may amount to from about 100:1 to about 1:100, or from about 10:1 to about 1:10 in another embodiment. In the polymer diol units, the degree of polymerization "b" may be in the range of from about 4 to about 200, or from about 12 to about 140 in an alternate embodiment. The average molecular weight of the polyesters with a soil detachment capacity may be in the range of from about 250 to about 100,000, or from about 500 to about 50,000 in an alternate embodiment. The acid on which the residue Ph is based may be selected from terephthalic acid, isophthalic acid, phthalic acid, trimellitic acid, mellitic acid, the isomers of sulfophthalic acid, sulfoisophthalic acid and sulfoterephthalic acid and mixtures thereof. Where the acid groups thereof are not part of the ester bond in the polymer, they may be present in salt form, such as an alkali metal or ammonium salt. Exemplary embodiments include sodium and potassium salts.

If desired, instead of the monomer HOOC—Ph—COOH, the polyester with a soil detachment capacity (the anti-redeposition agent) may include small proportions, such as no more than about 10 mole percent relative to the proportion of Ph with the above-stated meaning, of other acids that include at least two carboxyl groups. These include, for example, alkylene and alkenylene dicarboxylic acids such as malonic acid, succinic acid, fumaric acid, maleic acid, glutaric acid, adipic acid, pimelic acid, suberic acid, azelaic acid and sebacic acid. Exemplary diols HO—($CHR^{11}$—)$_a$OH include those in which $R^{11}$ is hydrogen and "a" is a number of from about 2 to about 6, and in another embodiment includes those in which "a" has the value of 2 and $R^{11}$ is selected from hydrogen and alkyl residues with 1 to 10 C atoms, or where $R^{11}$ is selected from hydrogen and alkyl residues with 1 to 3 C atoms in another embodiment. Examples of diol components are ethylene glycol, 1,2-propylene glycol, 1,3-propylene glycol, 1,4-butanediol, 1,5-pentanediol, 1,6-hexanediol, 1,8-octanediol, 1,2-decanediol, 1,2-dodecanediol and neopentyl glycol. The polymeric diols include polyethylene glycol with an average molar mass in the range from about 1000 to about 6000. If desired, these polyesters may also be end group-terminated, with end groups that may be alkyl groups with 1 to 22 C atoms or esters of monocarboxylic acids. The end groups attached via ester bonds may be based on alkyl, alkenyl and aryl monocarboxylic acids with 5 to 32 C atoms, or with 5 to 18 C atoms in another embodiment. These include valeric acid, caproic acid, enanthic acid, caprylic acid, pelargonic acid, capric acid, undecanoic acid, undecenoic acid, lauric acid, lauroleic acid, tridecanoic acid, myristic acid, myristoleic acid, pentadecanoic acid, palmitic acid, stearic acid, petroselinic acid, petroselaidic acid, oleic acid, linoleic acid, linolaidic acid, linolenic acid, eleostearic acid, arachidic acid, gadoleic acid, arachidonic acid, behenic acid, erucic acid, brassidic acid, clupanodonic acid, lignoceric acid, cerotic acid, melissic acid, benzoic acid, which may bear 1 to 5 substituents having a total of up to 25 C atoms, or 1 to 12 C atoms in another embodiment, for example tert-butylbenzoic acid. The end groups may also be based on hydroxymonocarboxylic acids with 5 to 22 C atoms, which for example include hydroxyvaleric acid, hydroxycaproic acid, ricinoleic acid, the hydrogenation product thereof, hydroxystearic acid, and ortho-, meta- and para-hydroxybenzoic acid. The hydroxymonocarboxylic acids may in turn be joined to one another via their hydroxyl group and their carboxyl group and thus be repeatedly present in an end group. The number of hydroxymonocarboxylic acid units per end group, i.e. their degree of oligomerization, may be in the range of from 1 to 50, or in the range of from 1 to 10 in another embodiment. In an exemplary embodiment, polymers of ethylene terephthalate and polyethylene oxide terephthalate, in which the polyethylene glycol units have molar weights of from about 750 to about 5000 and the molar ratio of ethylene terephthalate to polyethylene oxide terephthalate of from about 50:50 to about 90:10, are used alone or in combination with cellulose derivatives. The anti-redeposition agent is present in the composition at an amount of from about 0 to about 3 weight percent, or an amount of from about 0 to about 2 weight percent, or an amount of from about 0 to about 1 weight percent, based on the total weight of the fabric treatment composition, in various embodiments.

Optical brighteners may optionally be included in the composition. Optical brighteners adsorb ultraviolet and/or violet light and re-transmit it as visible light, typically a visible blue light. Optical brighteners include, but are not limited to, derivatives of diaminostilbene disulfonic acid or the alkali metal salts thereof. Suitable compounds are, for example, salts of 4,4'-bis(2-anilino-4-morpholino-1,3,5-triazinyl-6-amino)stilbene 2,2'-disulfonic acid or compounds of similar structure which, instead of the morpholino group, bear a diethanolamino group, a methylamino group, an anilino group or a 2-methoxyethylamino group. Optical brighteners of the substituted diphenylstyryl type may furthermore be present, such as the alkali metal salts of 4,4'-bis(2-sulfostyryl)diphenyl, 4,4'-bis(4-chloro-3-sulfostyryl)diphenyl, or 4-(4-chlorostyryl)-4'-(2-sulfostyryl) diphenyl. Mixtures of the above-stated optical brighteners may also be used. Optical brighteners may be present in the composition at an amount of from about 0 to about 1 weight percent in some embodiments, but in other embodiments optical brighteners are present in an amount of from about 0.01 to about 0.5 weight percent, or an amount of from about 0.05 to about 0.3 weight percent, or an amount of from 0.005 to about 5 weight percent, based on the total weight of the fabric treatment composition.

Foam inhibitors may also optionally be included in the composition. Suitable foam inhibitors include, but are not limited to, soaps of natural or synthetic origin, which include an elevated proportion of $C_{18}$-$C_{24}$ fatty acids. Suitable non-surfactant foam inhibitors are, for example, organopolysiloxanes and mixtures thereof with microfine, optionally silanized silica as well as paraffins, waxes, microcrystalline waxes and mixtures thereof with silanized silica or bis-fatty acid alkylenediamides. Mixtures of different foam inhibitors may also be used, for example mixtures of silicones, paraffins or waxes. In an exemplary embodiment, mixtures of paraffins and bistearylethylenediamide may be used. The composition may include the foam inhibitor at an amount of from about 0 to about 5 weight percent, but in other embodiments the foam inhibitor may be present at an amount of from about 0.05 to about 3 weight percent, or an amount of from about 0.5 to about 2 weight percent, based on the total weight of the fabric treatment composition.

Chelators bind and remove calcium, magnesium, or other metals from water, and may optionally be included in the composition. Many compounds can be used as water softeners, including but not limited to ethylenediaminetetraacetic acid (EDTA), nitrilotriacetic acid, diethylenetriaminepenta(methylenephosphonic acid), nitrilotris (methylenephosphonic acid), 1-hydroxyethane-1,1-diphosphonic acid, iminodisuccinic acid (IDS), or other chelating agents. Chelators may be present in the composition at an amount of from about 0 to about 5 weight percent in an exemplary embodiment, but in alternate embodiments the chelators are present at an amount of from about 0.01 to about 3 weight percent or an amount of from about 0.02 to about 1 weight percent, based on the total weight of the fabric treatment composition.

Bittering agents may optionally be added to hinder accidental ingestion of the single dose pack or the composition. Bittering agents are compositions that taste bad, so children or others are discouraged from accidental ingestion. Exemplary bittering agents include denatonium benzoate, aloin, and others. Bittering agents may be present in the composition at an amount of from about 0 to about 1 weight percent, or an amount of from about 0 to about 0.5 weight percent, or an amount of from about 0 to about 0.1 weight percent in various embodiments, based on the total weight of the fabric treatment composition.

The components of the composition are combined and mixed together with a mixer. Once mixed, the fabric treatment composition is encapsulated in the container, as described above. The components of the fabric treatment composition may all be mixed at one time, or different components may be pre-mixed and then combined. A wide variety of mixers may be used in alternate embodiments, such as an agitator, an in-line mixer, a ribbon blender, an emulsifier, and others. The fabric treatment composition is placed in a container, and then the film of the container is sealed with a sealer, where the sealer may utilize heat, water, ultrasonic techniques, water and heat, pressure, or other techniques for sealing the container and forming the single dose pack.

In addition to optional ingredients that may be included in the liquid portion of the fabric treatment composition, a unit dose pack may contain non-liquid ingredients in separate compartments of the unit dose.

Exemplary powder compositions that may be included in other compartments of the unit dose products disclosed herein are described in U.S. Pat. No. 8,497,234, the contents of which are incorporated herein by reference.

Particulate fragrance enhancers, such as those described in US 2018/0371378, the contents of which are incorporated herein by reference, may also be included in another compartment of the unit dose product.

In one embodiment, the liquid fabric treatment composition and/or fabric treatment unit dose product is laundry scent booster composition suitable for use in the washing of fabrics and/or garments. The fabrics and/or garments subjected to a washing, cleaning or textile care processes contemplated herein may be conventional washable laundry, such as household laundry. In some embodiments, the major part of the laundry is garments and fabrics, including but not limited to knits, woven fabrics, denims, non-woven fabrics, felts, yarns, and toweling. The fabrics may be cellulose based such as natural cellulosics, including cotton, flax, linen, jute, ramie, sisal or coir or manmade cellulosics (e.g., originating from wood pulp) including viscose/rayon, ramie, cellulose acetate fibers (tricell), lyocell or blends thereof. The fabrics may also be non-cellulose based such as natural polyamides including wool, camel, cashmere, mohair, rabbit, and silk, or the fabric may be a synthetic polymer such as nylon, aramid, polyester, acrylic, polypropylene and spandex/elastin, or blends of any of the above-mentioned products. Examples of blends are blends of cotton and/or rayon/viscose with one or more companion material such as wool, synthetic fibers (e.g., polyamide fibers, acrylic fibers, polyester fibers, polyvinyl alcohol fibers, polyvinyl chloride fibers, polyurethane fibers, polyurea fibers, aramid fibers), and cellulose-containing fibers (e.g., rayon/viscose, ramie, flax, linen, jute, cellulose acetate fibers, lyocell).

In one embodiment, the fabrics and/or garments are added to a washing machine, and the liquid fabric care composition or a unit dose pack containing the liquid fabric treatment composition is also added to the washing machine before wash water is added. In an alternate embodiment, the single dose pack may be added to an automatic detergent addition system of a washing machine, where the contents of the single dose pack are added to the wash water with the fabrics and/or garments after the washing process has begun. In yet another embodiment, the single dose pack is manually added to the fabrics and/or garments with the wash water after the washing process has started. The film dissolves and releases the wash composition into the aqueous wash water. The film is dissolved and washes out of the washing machine with the excess wash water, so there is nothing to collect from the fabrics and/or garments after the wash cycle. The fabrics and/or garments are laundered with the wash water and the contents of the single dose pack. The fabrics and/or garments may then be dried and processed as normal.

EXAMPLES

The present disclosure is now illustrated by the following non-limiting examples. It should be noted that various changes and modifications can be applied to the following examples and processes without departing from the scope of this disclosure, which is defined in the appended claims. Therefore, it should be noted that the following examples should be interpreted as illustrative only and not limiting in any sense.

Example 1: Liquid Fabric Treatment Compositions

Exemplary liquid fabric treatment compositions having the ingredients of TABLE 1 are prepared by mixing the non-aqueous solvents first, then the nonionic AE surfactant, then adding the encapsulated slurry, followed by adding the rheology polymer and Triethanolamine.

TABLE 1

| Ingredient/Composition | % w/w |
|---|---|
| Encapsulated Fragrance Slurry | 25-48 |
| PEG MW 200-1,000 | 25-50 |
| Glycerin | 10-25 |
| Propylene Glycol | 5-10 |
| Rheology polymer | 1.5-3.5 |
| Triethanolamine | 0.5-2 |
| Alcohol Ethoxylate | 3.75-8 |

The compositions are stable without any phase separation up after 1 week at ambient and elevated temperature and can be contained in a unit dose pack comprised of PVOH. The liquid compositions contained in the unit dose pack have consistent dissolvability when the pack is used in standard washing machine cycles at various water temperatures.

Example 2: Effect of AE Surfactant

Fabric treatment compositions were prepared by mixing the non-aqueous solvents first, then the nonionic AE surfactant, then adding the encapsulated slurry, followed by adding the HASE polymer and Triethanolamine. The compositions were placed in glass jars with a screw top lid and stored at ambient conditions (about 25° C.), 40° C., and 54° C. for up to 4 weeks.

TABLE 2

| | % w/w | | | | |
|---|---|---|---|---|---|
| Ingredient/Composition | C0 | C2 | C5 | C10 | C15 |
| Encapsulated Fragrance Slurry | 33.3 | 33.3 | 33.3 | 33.3 | 33.3 |
| PEG 400 | 35.0 | 35.0 | 35.0 | 35.0 | 35.0 |
| Glycerin | 19.3 | 17.9 | 15.9 | 12.6 | 9.3 |
| Propylene Glycol | 9.6 | 9.0 | 8.0 | 6.3 | 4.6 |
| HASE polymer | 2.0 | 2.0 | 2.0 | 2.0 | 2.0 |
| Triethanolamine | 0.8 | 0.8 | 0.8 | 0.8 | 0.8 |
| 25-7: Alcohol Ethoxylate C12-15 7EO | 0.0 | 2.0 | 5.0 | 10.0 | 15.0 |

Figure 2:
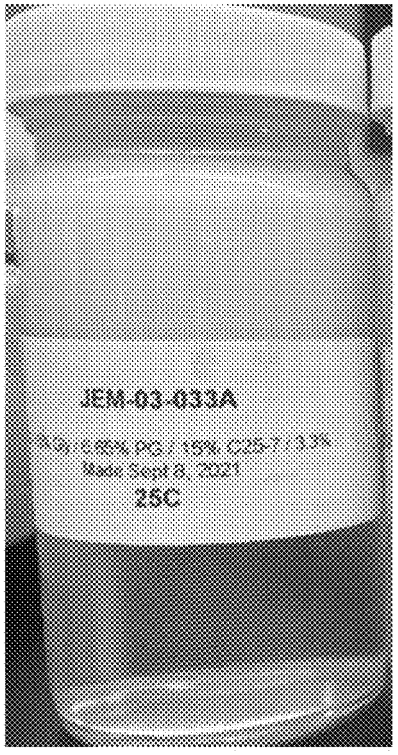
FIG. 2 is a photograph of composition C15 of Example 2 after storage for 4 weeks at about 25° C.

FIG. 1 shows a photograph of the compositions C0, C2, C5 and C10 after 1 week at 25° C. $C_{10}$ showed phase separation after 1 week whereas C0, C2, and C5 remain dispersed after 4 weeks at room temperature. FIG. 2 shows C15 after 4 weeks at room temperature; like C10, C15 showed phase separation at room temperature. No observable difference was seen by addition of 2% by weight to 5% by weight of the alcohol ethoxylate surfactant when the compositions were stored at room temperature.

Figure 3:
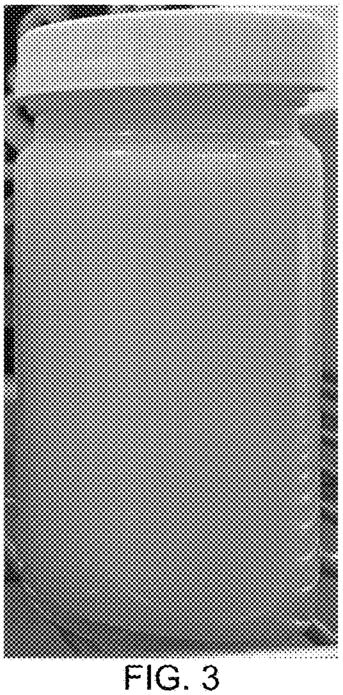
FIG. 3 is a photograph of composition C5 of Example 2 after storage for 4 weeks at 40° C.

However, surprisingly, alcohol ethoxylate surfactant improved stability when the compositions were stored at 40° C. for 1 week. The composition C5 containing 5% AE remained dispersed whereas phase separation (shown by darker shadow on bottom half of container in FIG. 2) was observed for C0 and C2 having 0% or 2% by weight AE. The stability of C5 was maintained for 4 weeks at 40° C. as shown in FIG. 3 where a consistent color of the composition can be seen throughout the composition.

Example 3: Storage Modulus and Yield Stress

To confirm the visual observations, Yield stress and G' of Composition C5 of Example 2 was measured on a Discovery HR20 Rheometer from TA Instrument using a 511406.945 Cone SST ST 40 mm 2DEG Smart Swap geometry. C0 was used as a comparator. The method was Oscillation Amplitude 25° C., 30 s soak time, angular frequency of 10 rad/sec, with a Linear sweep from 0.1 Pa to 1010 Pa in increments of 5 Pa. Results are shown in TABLE 3.

TABLE 3

| | Initial G' | | Yield Stress | |
|---|---|---|---|---|
| Formula | 40° C., 1 wk | 54° C., 1 wk | 40° C., 1 wk | 54° C., 1 wk |
| C0 | 1074 | 2608.6 | 5 | 32 |
| C5 | 6.6 | 58.2 | 2.3 | 1.5 |

The lower storage modulus and yield stress for the composition containing AE indicate that it will have better flowability and less encapsulate agglomeration when placed in wash water.

Visual observation of the dispersibility of the two formulas tested for yield stress and storage modulus was confirmed in wash tests. The liquid compositions were encapsulated in unit dose packs and placed in a wash cycle of a washing machine. A unit dose pack containing composition C5 had better dissolvability and dispersibility in the washing machine.

Example 4: Effect of AE Surfactant at Elevated Storage Conditions

Fabric treatment compositions were prepared by mixing the non-aqueous solvents first, then the nonionic AE surfactant, then adding the encapsulated slurry, followed by adding the HASE polymer and Triethanolamine. The compositions were placed in glass jars with a screw top lid and stored at 40° C. for 1 week.

TABLE 4

| | Composition % w/w | | | | | |
|---|---|---|---|---|---|---|
| Ingredient | C2.5 | C3.5 | C4.5 | C5.5 | C6.5 | C7.5 |
| Encapsulated Fragrance Slurry | 33.3 | 33.3 | 33.3 | 33.3 | 33.3 | 33.3 |
| PEG 400 | 35.0 | 35.0 | 35.0 | 35.0 | 35.0 | 35.0 |
| Glycerin | 17.9 | 17.2 | 16.5 | 15.9 | 15.2 | 14.5 |
| Propylene Glycol | 8.5 | 8.2 | 7.9 | 7.5 | 7.2 | 6.9 |
| HASE polymer | 2.0 | 2.0 | 2.0 | 2.0 | 2.0 | 2.0 |

TABLE 4-continued

| | Composition % w/w | | | | | |
|---|---|---|---|---|---|---|
| Ingredient | C2.5 | C3.5 | C4.5 | C5.5 | C6.5 | C7.5 |
| Triethanolamine | 0.8 | 0.8 | 0.8 | 0.8 | 0.8 | 0.8 |
| 25-7: Alcohol Ethoxylate C12-15 7EO | 2.5 | 3.5 | 4.5 | 5.5 | 6.5 | 7.5 |

Figure 4:
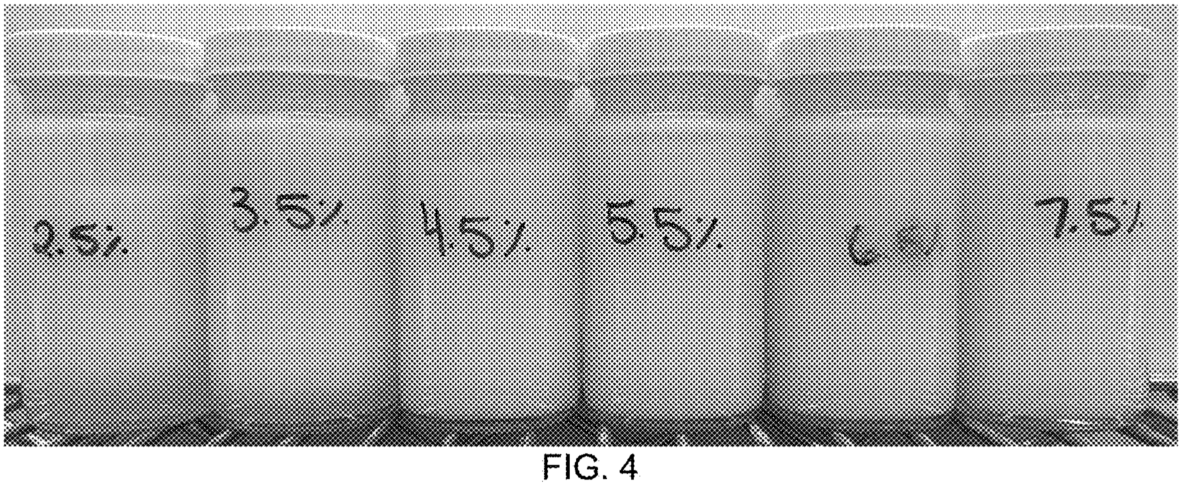
FIG. 4 is a photograph of compositions of Example 4 after storage for 1 week at 40° C.

FIG. 4 shows a photograph of the compositions C2.5, C3.5, C4.5, C5.5, C6.5 and C7.5 after 1 week at 40° C. Compositions having 2.5% and 3.5% by weight of the AE showed phase separation when stored at elevated conditions. It was determined that the amount of AE is critical to stability of the compositions at elevated temperature.

When AE, in particular C25-7: Alcohol Ethoxylate C12-15 7EO, is added at low level to liquid fabric treatment compositions containing encapsulated fragrance slurry, the encapsulated fragrance slurry is stabilized, negative film interactions are minimized, and dissolvability is optimized. Such formulas have the processing benefit of stability at elevated temperatures, which ensures product quality remains good even after exposure to high-temperature shipping conditions. This stability also improves the appearance of finished unit dose packs containing the liquid fabric treatment compositions over less stable liquids. It also has the benefit to consumers of dissolving well in the wash cycle to deposit encapsulated fragrance on fabrics effectively to create long-lasting fragrance.

The present application incorporates by reference entirely the disclosure of US Patent Application Publication No. 2021/0309940.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A fabric treatment unit dose product comprising:

at least one water-soluble compartment enclosing a liquid composition, wherein the liquid composition comprises, based on the total weight of the liquid composition:

from about 3.75% by weight to about 8% by weight of a $C_{10-15}$ alcohol ethoxylate having 3 to 8 moles of ethylene oxide per mole of alcohol;

from about 10% by weight to about 70% by weight of an encapsulated fragrance slurry;

from about 0.5% by weight to about 5% by weight of a rheology modifier;

from about 0.1% by weight to about 3% by weight of a pH adjusting agent; and from about to about 5% by weight to about 60% by weight of a non-aqueous solvent.

2. The fabric treatment unit dose product of claim 1, wherein the rheology modifier is an acrylic copolymer, an alkali soluble emulsion (ASE), or a hydrophobically modified alkali soluble emulsion (HASE) polymer.

3. The fabric treatment unit dose product of claim 1, further comprising from about 10% by weight to about 60% by weight, based on the total weight of the liquid composition, of a polyethylene glycol having a molecular weight between about 200 and about 1000 Daltons.

4. The fabric treatment unit dose product of claim 1, wherein the pH adjusting agent is selected from the group consisting of triethanolamine, monoethanolamine, tromethamine, sodium carbonate, sodium bicarbonate, sodium borate, diethylenetriaminepentaacetic acid (DTPA), ethylenediaminetetraacetic acid (EDTA), methylglycinediacetic acid (MGDA), iminodisuccinic acid (IDS), ethylenediamine-N,N'-disuccinic acid (EDDS), and tetrasodium glutamate diacetate (GLDA).

5. The fabric treatment unit dose product of claim 1, wherein the non-aqueous solvent is selected from the group consisting of ethylene glycol, glycerin, ethanol, dipropylene glycol, tripropylene glycol methyl ether, propylene glycol, and any mixture thereof.

6. The fabric treatment unit dose product of claim 5, wherein the non-aqueous solvent comprises a first non-aqueous solvent present in an amount of from about 5% by weight to about 40% by weight, based on the total weight of the liquid composition, and a second non-aqueous solvent present in an amount of from about 1% by weight to about 20% by weight, based on the total weight of the liquid composition.

7. A liquid fabric treatment composition comprising, based on the total weight of the liquid fabric treatment composition:

less than 40% by weight water;

from about 3.75% by weight to about 8% by weight of a $C_{10-15}$ alcohol ethoxylate having 3 to 8 moles of ethylene oxide per mole of alcohol;

from about 10% by weight to about 70% by weight of an encapsulated fragrance slurry;

from about 0.5% by weight to about 5% by weight of a rheology modifier;

from about 0.1% by weight to about 3% by weight of a pH adjusting agent;

from about 5% by weight to about 60% by weight of a non-aqueous solvent; and from about 10% by weight to about 60% by weight of a polyethylene glycol having a molecular weight between about 200 and about 1000 Daltons, wherein the liquid fabric treatment composition does not phase separate when stored at 40° C. for 1 week.

8. The liquid fabric treatment composition of claim 7, wherein the rheology modifier is an acrylic copolymer, an alkali soluble emulsion (ASE), or a hydrophobically modified alkali soluble emulsion (HASE) polymer.

9. The liquid fabric treatment composition of claim 7, wherein the polyethylene glycol has a molecular weight of about 400 Daltons.

10. The liquid fabric treatment composition of claim 7, wherein the pH adjusting agent is selected from the group consisting of triethanolamine, monoethanolamine, tromethamine, sodium carbonate, sodium bicarbonate, sodium borate, diethylenetriaminepentaacetic acid (DTPA), ethylenediaminetetraacetic acid (EDTA), methylglycinediacetic acid (MGDA), iminodisuccinic acid (IDS), ethylenediamine-N,N'-disuccinic acid (EDDS), and tetrasodium glutamate diacetate (GLDA).

11. The liquid fabric treatment composition of claim 7, wherein the non-aqueous solvent is selected from the group consisting of ethylene glycol, glycerin, ethanol, dipropylene glycol, tripropylene glycol methyl ether, propylene glycol, and any mixture thereof.

12. The liquid fabric treatment composition of claim 7, wherein the non-aqueous solvent comprises a first non-aqueous solvent present in an amount of from about 5% by weight to about 40% by weight, based on the total weight of the liquid fabric treatment composition, and a second non-aqueous solvent present in an amount of from about 1% by weight to about 20% by weight, based on the total weight of the liquid fabric treatment composition.

13. The liquid fabric treatment composition of claim 12, wherein the first non-aqueous solvent is selected from the group consisting of ethylene glycol, glycerin, ethanol, dipropylene glycol, tripropylene glycol methyl ether, and any mixture thereof, and the second non-aqueous solvent is propylene glycol.

14. The liquid fabric treatment composition of claim 7, wherein the composition has a storage modulus of less than 30 Pa and/or a yield stress of less than 5 Pa.

15. A fabric treatment unit dose product comprising:

at least one water-soluble compartment enclosing a liquid composition, wherein the liquid composition comprises, based on the total weight of the liquid composition:

from about 3.75% by weight to about 8% by weight of a $C_{10-15}$ alcohol ethoxylate having 3 to 8 moles of ethylene oxide per mole of alcohol;

from about 25% by weight to about 48% by weight of an encapsulated fragrance slurry;

from about 0.5% by weight to about 5% by weight of a rheology modifier;

from about 0.1% by weight to about 3% by weight of a pH adjusting agent;

from about 5% by weight to about 40% by weight of a first non-aqueous solvent;

from 0% by weight to about 20% by weight of a second non-aqueous solvent; and from about 25% by weight to about 50% by weight of a polyethylene glycol, wherein the polyethylene glycol has a molecular weight between about 200 and about 1000 Daltons.

16. The fabric treatment unit dose product of claim 15, wherein the rheology modifier is an acrylic copolymer, an alkali soluble emulsion (ASE), or a hydrophobically modified alkali soluble emulsion (HASE) polymer.

17. The fabric treatment unit dose product of claim 15, wherein the polyethylene glycol has a molecular weight of about 400 Daltons.

18. The fabric treatment unit dose product of claim 15, wherein the pH adjusting agent is selected from the group consisting of triethanolamine, monoethanolamine, tromethamine, sodium carbonate, sodium bicarbonate, sodium borate, diethylenetriaminepentaacetic acid (DTPA), ethylenediaminetetraacetic acid (EDTA), methylglycinediacetic acid (MGDA), iminodisuccinic acid (IDS), ethylenediamine-N,N'-disuccinic acid (EDDS), tetrasodium glutamate diacetate (GLDA), and any mixture thereof.

19. The fabric treatment unit dose product of claim 15, wherein the first non-aqueous solvent and the second non-aqueous solvent are each, independently, selected from the group consisting of ethylene glycol, glycerin, ethanol, dipropylene glycol, tripropylene glycol methyl ether, propylene glycol, and any mixture thereof.

20. The fabric treatment unit dose product of claim 19, wherein the first non-aqueous solvent is glycerin and the second non-aqueous solvent is propylene glycol.

21. The fabric treatment unit dose product of claim 1, wherein the alcohol ethoxylate is a $C_{12-15}$ alcohol ethoxylate having 7 moles of ethylene oxide per mole of alcohol.

22. The liquid fabric treatment composition of claim 7, wherein the alcohol ethoxylate is a $C_{12-15}$ alcohol ethoxylate having 7 moles of ethylene oxide per mole of alcohol.

23. The fabric treatment unit dose product of claim 15, wherein the alcohol ethoxylate is a $C_{12-15}$ alcohol ethoxylate having 7 moles of ethylene oxide per mole of alcohol.

* * * * *